(12) United States Patent
Kunkel et al.

(10) Patent No.: US 10,601,503 B1
(45) Date of Patent: Mar. 24, 2020

(54) SYSTEMS AND METHODS FOR OVER-THE-HORIZON COMMUNICATION

(71) Applicants: Levi E. Kunkel, Stafford, VA (US);
Deke E. Kunkel, Cheyenne, WY (US);
Joseph M. Reynolds, Yokosuka (JP);
John M. Edwards, II, Washington, DC (US)

(72) Inventors: Levi E. Kunkel, Stafford, VA (US);
Deke E. Kunkel, Cheyenne, WY (US);
Joseph M. Reynolds, Yokosuka (JP);
John M. Edwards, II, Washington, DC (US)

(73) Assignee: FOURTH STATE COMMUNICATIONS, INC., Stafford, VA (US)

( * ) Notice: Subject to any disclaimer, the term of this patent is extended or adjusted under 35 U.S.C. 154(b) by 325 days.

(21) Appl. No.: 15/495,341

(22) Filed: Apr. 24, 2017

Related U.S. Application Data

(60) Provisional application No. 62/327,151, filed on Apr. 25, 2016.

(51) Int. Cl.
*H04B 7/22* (2006.01)

(52) U.S. Cl.
CPC .................................. *H04B 7/22* (2013.01)

(58) Field of Classification Search
CPC ........ H04B 1/38; H04B 7/22; H04W 72/0426
See application file for complete search history.

(56) References Cited

U.S. PATENT DOCUMENTS

| | | | |
|---|---|---|---|
| 4,999,637 A | 3/1991 | Bass | |
| 5,041,834 A | 8/1991 | Koert | |
| 5,053,783 A | 10/1991 | Papadopoulos | |
| 5,134,715 A | 6/1992 | Parl et al. | |
| 5,541,955 A * | 7/1996 | Jacobsmeyer | H03D 3/241 375/222 |
| 6,252,756 B1 * | 6/2001 | Richie, Jr. | H01T 23/00 361/213 |
| 7,557,647 B2 * | 7/2009 | Gorrell | H01J 25/00 250/336.1 |
| 2005/0100336 A1 * | 5/2005 | Mendenhall | G01S 7/4802 398/27 |
| 2007/0215946 A1 | 9/2007 | Eastlund | |
| 2007/0238252 A1 | 10/2007 | Eastlund | |

\* cited by examiner

*Primary Examiner* — Dao L Phan
(74) *Attorney, Agent, or Firm* — Fox Rothschild LLP

(57) ABSTRACT

A communication system and method is described, comprising of two or more locations in which an artificially modulated ionized region is created at one or more locations and either passively or actively remotely sensed from another distant location, to create a communication exchange between locations which may lie over-the-horizon from one another. The height of the artificially modulated ionized region may be adjusted in altitude, to optimize the communications link for either maximum distance, or low latency. The system and method may use radio frequencies ranging from 400-2400 MHz, at power levels ranging from 1-10 MW to remain above a threshold where the negative effects of atmospheric ducting may occur, but also low enough to avoid the negative effects of rain fading at higher frequencies. This frequency range may be optimal for reliable use in adverse weather conditions and able to produce data rates that are commercially viable.

10 Claims, 15 Drawing Sheets

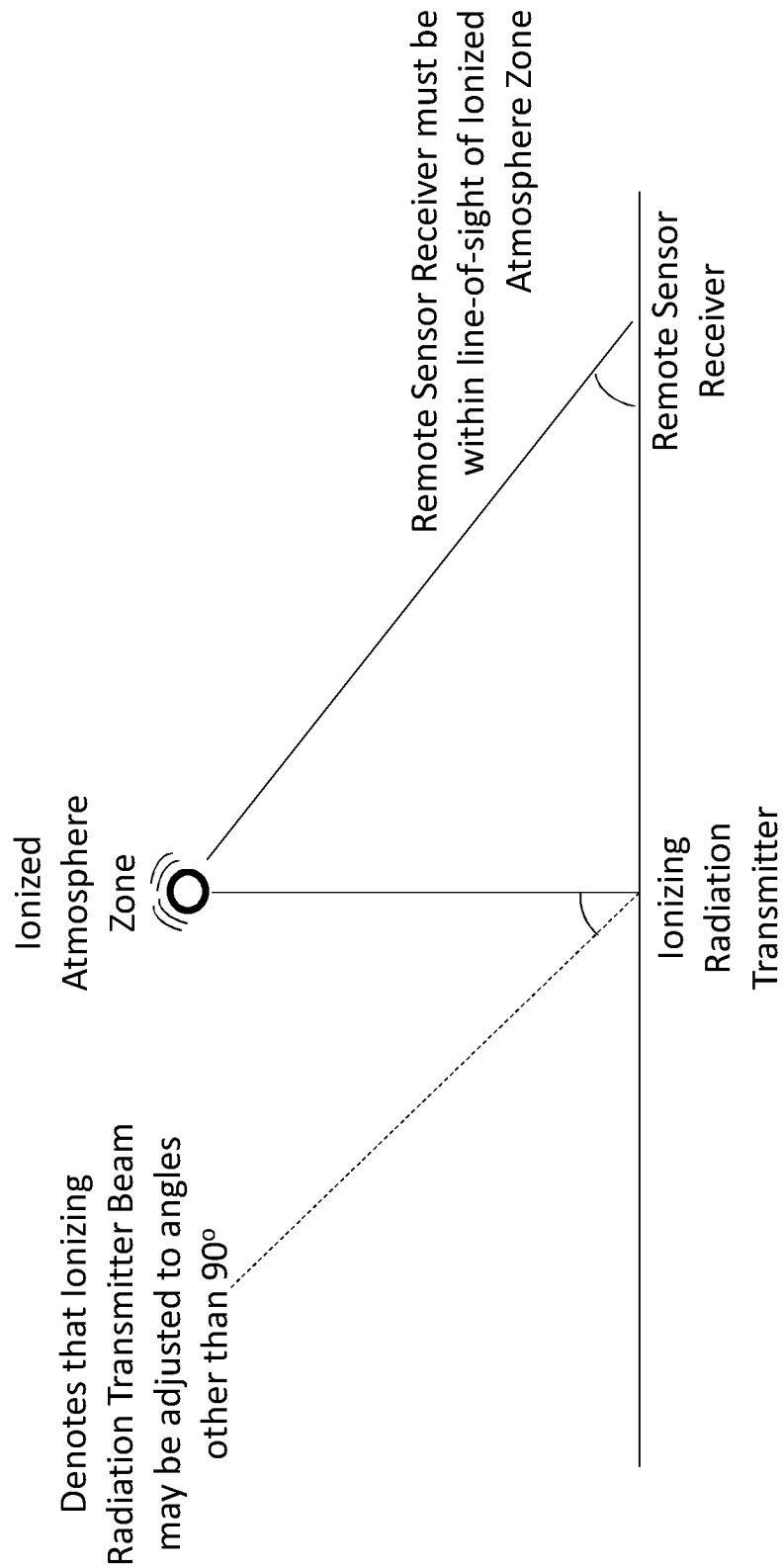

SYSTEMS AND METHODS FOR OVER-THE-HORIZON COMMUNICATION

CROSS REFERENCE TO RELATED APPLICATIONS

Figure 1:
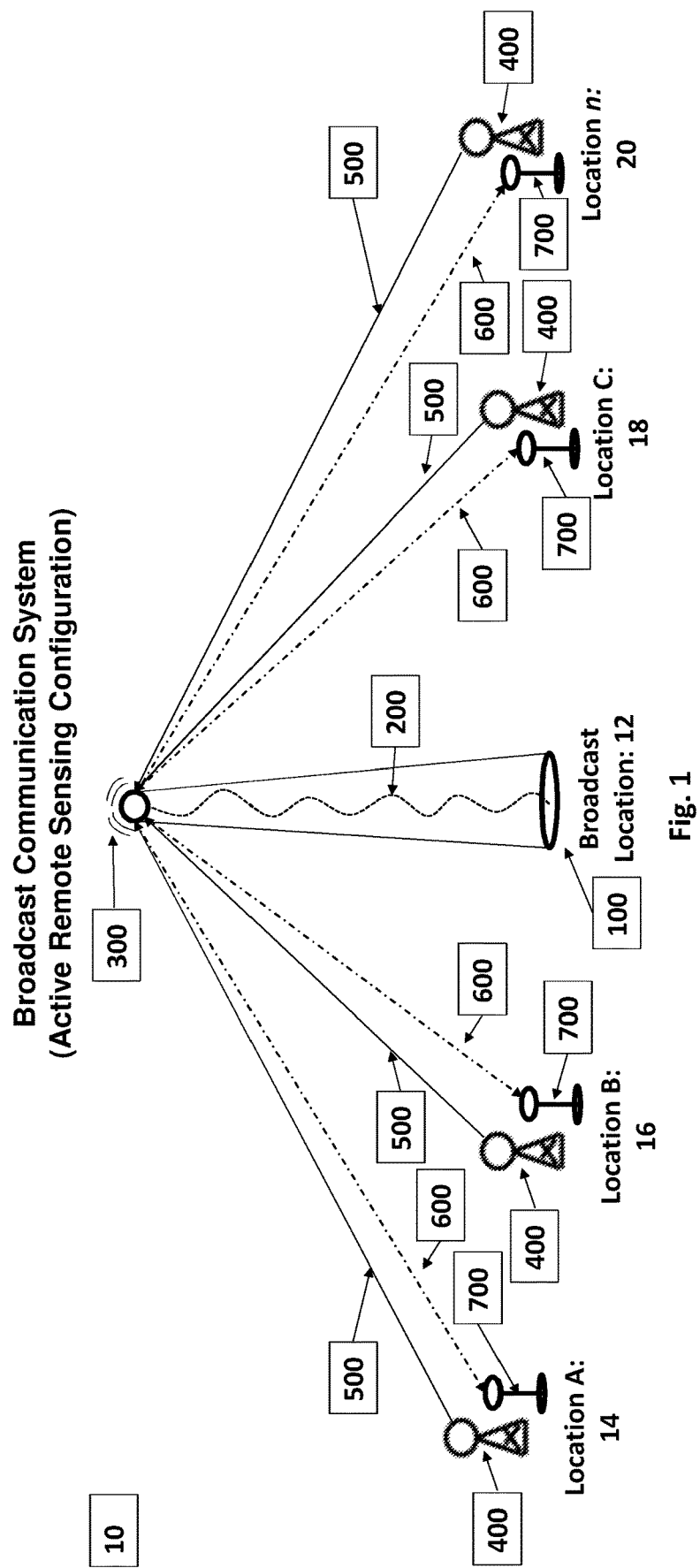

This application is an international application filed under 35 U.S.C. § 120 and claims priority to U.S. Provisional Application Ser. No. 62/327,151 filed Apr. 25, 2016, which is incorporated by reference as if fully disclosed herein. U.S. Provisional Application Ser. No. 61/785,791, filed Mar. 14, 2013 is incorporated by reference as if fully disclosed herein.

STATEMENT OF THE TECHNICAL FIELD

This disclosure relates to radio frequency communications systems and methods including, for example, methods of transferring information from one location to another through the use of atmospheric target modulation to be detected by either passive or active remote sensing from another distant location.

BACKGROUND

There are multiple methods for manipulating the atmosphere, which include; acoustic, gyro-resonance, radio frequency, visible and non-visible light spectrum, etc. While there are multiple methods for manipulating the atmosphere, in order to transfer information from one location to another, radio frequency (RF) and LASER induced atmospheric manipulation are currently among the most prevalent methods.

For example, U.S. Pat. Nos. 5,134,715, 4,999,637, US 20070215946, US 20070238252, U.S. Pat. Nos. 5,053,783, and 5,041,834, the disclosures of which are incorporated by reference as if fully disclosed herein, discloses the use of artificially ionized atmosphere for the purpose of refracting radio frequency signals from one location to another.

Other methods include the use of optical images in the atmosphere to be observed at another distant location for information transfer from one location to another. For example, U.S. Pat. No. 7,533,995, the disclosure of which is incorporated by reference as if fully disclosed herein, discloses the use of LASERs for forming a visible image in the atmosphere. Also, U.S. Pat. No. 7,286,766, the disclosure of which is incorporated by reference as if fully disclosed herein, describes the use of a "laser guide star" with modulated light, in order to create a free-space optical communications link. Other examples include the use of LASERs for irradiating the atmosphere for astronomy or communications purposes. However, this method of optical communications lacks all-weather reliability and rapidly degrades over long distances.

SUMMARY

The present disclosure relates, for example, to a process for communications through the use of either passive or active remote sensing detection and decoding of a modulating target in the atmosphere. Communication may comprise the transfer of network timing information, navigation information, and other information related to the field of communications in the internet of things. While detection of a modulating target through means of remote sensing is a simple premise, there are in fact several configurations, through which this process can be employed. Herein, there are three primary exemplary types of configurations; a Broadcast configuration for both active and passive remote sensing, a Telecommunications link configuration for both active and passive remote sensing, and a 'remote modulation' configuration.

Broadcast Configuration Equipment String. This is, for example, a half-duplex communications system, where a single location disseminates information to multiple locations. A communications system in a Broadcast configuration is disclosed that includes, for example, a Broadcast transmission source location and multiple Broadcast receiver locations.

The broadcast transmission source location may include, for example, a radiation generator device to produce radiation, for example, RF radiation, intended to ionize the atmosphere at any altitude determined by the user. The broadcast transmission source location may also include a modulation device connected to the radiation generator device for the purpose of modulating the radiation. A device with the ability to contain and transmit any information related to the field of the internet of things is connected to the modulation device producing the modulation of the radiation.

The broadcast receiving locations, for example, may include either a passive remote sensor or an active remote sensor. A passive remote sensor, for example, may comprise a receiver for the purpose of receiving radiation, for example, RF radiation, emitted from the ionization created by the broadcast transmission source at some altitude determined by the user. An active remote sensor, for example, may comprise both a transmitter and receiver, where the transmitter emits radiation in order to contact the ionization region produced by the broadcast transmission source, then be reflected back towards the active remote sensor where the reflected radiation is captured by the receiver of the active remote sensor. For either a passive remote sensor or active remote sensor at any broadcast receiver location, a device intended for the purpose of demodulating the received radiation will be connected to either the passive remote sensor receiver or active remote sensor receiver. A decoding device for the purpose of converting the demodulated radiation signal into the information input by the user at the broadcast transmission source is connected to the demodulation device at the broadcast receiver location.

Broadcast Configuration Signal Flow. The broadcast process begins when radiation from the broadcast transmission source extends into the atmosphere at some altitude. The radiation creates a zone of ionization in the atmosphere at some altitude determined by the user. The ionization zone creates a plasma density where radio frequencies up to the critical density for radio frequency reflection may occur. Also, multiple zones of ionization may be created by the broadcast transmission source, creating a pattern of ionized zones. Once the zone(s) of ionization is/are established, the broadcast transmission source is modulated with information. Modulation may comprise, but is not limited to; on/off keying, power, frequency, or location fluctuation. This modulation information may comprise network timing information, navigation information, or other communication information, for example, within the field of the internet of things. Separately, at the broadcast receiver locations, there may be either a passive or active remote sensor receiver, where the modulation of the ionized zone(s) is remotely sensed and the communication information is de-modulated at the broadcast receiver locations into the intended information transmitted from the broadcast transmission source.

Telecommunications Link Configuration Equipment String. A communications system in a telecommunications link configuration is disclosed allowing, for example, for the transmitting and receiving of full-duplex information from one location to another. The equipment string comprising the telecommunications link configuration may include a modulated radiation transmission source and either an active or passive remote sensor receiver.

The modulated radiation transmission source may include, for example, a generator device to generate radiation intended to ionize the atmosphere at any altitude determined by the user. The modulated radiation transmission source may also include a modulation device connected to the generator device for the purpose of modulating the radiation. A device with the ability to contain and transmit any information related to the field of the internet of things is connected to the modulation device.

Either a passive or active remote sensor receiver may also be co-located with the modulated radiation transmission source and comprises a device for de-modulating the ionization radiation produced by another modulated radiation transmission source at another separate location. A passive remote sensor, for example, may comprise a receiver for the purpose of receiving radiation emitted from the ionization created by the other location's modulated radiation transmission source at some altitude determined by the user. An active remote sensor, for example, may comprise both a transmitter and receiver, where the transmitter emits radiation in order to contact the ionization produced by the other location's modulated radiation transmission source, then be reflected back towards the active remote sensor where the radiation is captured by the receiver of the active remote sensor. For either a passive remote sensor or active remote sensor at either location, a device intended for the purpose of demodulating the received radiation may be connected to either the passive remote sensor receiver or active remote sensor receiver. A device for the purpose of converting the demodulated radiation into the information input by the user from the other location may be connected to the demodulation device at its respective location.

Telecommunications Link Configuration Signal Flow. This configuration is, for example, comprised of a modulated radiation transmission source and a remote sensor receiver at a single location, and the entire configuration comprises two separate locations, where one location detects the ionized radiation from the opposite location for the purpose of transmitting and receiving information. Since both locations may in effect possess a transmitter (modulated radiation transmission source) and a receiver (remote sensor), full-duplex information can be exchanged. The telecommunications link configuration process begins when radiation from the modulated radiation transmission source extends into the atmosphere at some altitude and location. The radiation creates a zone of ionization in the atmosphere at some altitude and location determined by the user. The ionization zone creates a plasma density where radio frequencies up to the critical density for radio frequency reflection may occur. Also, multiple zones of ionization may be created by the modulated radiation transmission source, creating a pattern of ionized zones. Once the zone(s) of ionization is/are established, the modulated radiation transmission source may be modulated with information. Modulation may comprise, but is not limited to; on/off keying, power, frequency, or location fluctuation. This modulation information may comprise network timing information, navigation information, or other communication information, for example, within the field of the internet of things.

At the same location, there may be either a passive or active remote sensor receiver, where the modulation of the opposite location's ionized zone(s) is remotely sensed and the communication information is de-modulated into the intended information transmitted from the opposite location's ionized zone(s). The two separate locations have a transmitter (modulated radiation transmission source) and a receiver (remote sensor), which enables the telecommunication link configuration to be full-duplex. When the modulated radiation from the opposite location's modulated radiation transmission source is remotely detected, a beyond line-of-sight communication link may be established. Distance of the communication link may be extended by adding relay locations. A relay location comprises, for example, two modulated radiation transmission sources, and two remote sensor receivers. The two remote sensors act as receivers for both locations, while the two modulated radiation transmission sources act as transmitters for both locations. This enables the communications link to remain full-duplex and extend the entire communications link path further.

Remote Modulation Configuration Equipment String. This is a full-duplex communications system. A communications system in a remote modulation configuration is disclosed that includes, for example, three distinct locations to create a communications link, where the two end destination locations possess an active remote sensor receiver and a modulated radiation transmission source, and the third location comprises, for example, two radiation transmission sources.

At the two end destination locations, an active remote sensor receiver may be co-located with a modulated radiation transmission source and comprises, for example, a device for de-modulating the ionization radiation produced by another modulated radiation transmission source at another separate location. An active remote sensor, for example, may comprise both a transmitter and receiver, where the transmitter emits radiation in order to contact the ionization produced by the other location's modulated radiation transmission source, then be reflected back towards the active remote sensor where the reflected radiation is captured by the receiver of the active remote sensor. For the active remote sensor at either distant end location, a device intended for the purpose of demodulating the received radiation may be connected to the active remote sensor receiver. A device for the purpose of converting the demodulated radiation into the information input by the user from the other location may be connected to the demodulation device at its respective location.

At the third center location of the remote modulation configuration, there may be two radiation sources for the purpose of creating two separate ionization zones at some given altitude in the atmosphere specified by the user. These ionization zones are intended to remain steady and unmodulated.

Remote Modulation Configuration Signal Flow. This process begins when radiation from the two radiation transmission sources co-located together at the center location are activated to produce two independent zones of ionization at some specified altitude and location as determined by the user. The two ionization zones create a plasma density where radio frequencies up to the critical density for radio frequency reflection may occur. Also, multiple zones of ionization may be created by the modulated radiation transmission source, creating a pattern of ionized zones. Once the zones of ionization are established, the modulated radiation transmission sources located at the two end locations are activated and modulated with information. Modulation may comprise, but is not limited to; power, frequency, or location fluctuation. This modulation information may comprise network timing information, navigation information, or other communication information, for example, within the field of the internet of things. At the same location, there may be an active remote sensor receiver. A first location's modulated radiation transmission source makes contact with one of the two independently produced zones of ionization. The opposite location's active remote sensor receiver is activated and directed at the zone of ionization where the opposite location to it is striking the zone of ionization with its modulated radiation transmission source. When the modulated radiation from the opposite location's modulated radiation transmission source is remotely detected, a beyond line-of-sight communication link is established.

What makes the systems and methods described here superior to all other previous methods lies, for example with certain embodiments in all-weather reliability, low latency, and signal-to-noise strength over long distances. Where others have tried and failed to create an ionized region of the atmosphere for the purpose of refracting a radiation signal from one location to another, certain embodiments of the disclosed systems and methods overcome those past obstacles. When refracting an radiation signal off of an ionized region of atmosphere, a large flat surface is required. However, the power and control required to do this is impractical. The disclosed systems and methods may differ in the use of reflection. The ionized atmospheric region may be any shape, and much smaller. This reduces the power requirement for useful ionization, while also reducing the control needed in closing a communications link between two distant locations over-the-horizon. This is due to the fact that reflection remains detectable over long ranges, and allows the distant locations to be located anywhere within line-of-sight. The final benefit to certain embodiments of this process lies in the use of RF radiation versus light. Where laser guided star communications falls short, is in detection through weather. In certain embodiments of the disclosed systems and methods, frequencies between, for example, 400-2400 MHz are used in order to avoid atmospheric ducting effects at lower frequencies, but also low enough to avoid rain fade at higher frequencies. The RF frequency range is high enough to produce the highest allowable data rates, within the constrains of Nyquist's Limit, while remaining under the critical density of the modulating ionization. The use of this process along with the application of technologies, such as phased array antennas allows for RF to be applied at higher density in smaller areas for the efficient production of ionized atmosphere at critical densities high enough to support frequencies in the UHF band, while also allowing for remote sensors to efficiently send and receive RF signals to and from the ionized atmospheric region for demodulation processing well above the noise floor. These efficiencies also allow for passive detection, which is also further described subsequently.

BRIEF DESCRIPTION OF THE DRAWINGS

Embodiments will be described with reference to the following drawing figures, in which like numerals represent like items throughout the figures, and in which:

FIG. 1 is a diagram of an active remote sensing broadcast communication system configuration.

FIG. 2 is a flow chart showing a signal flow process for use in an active remote sensor receiver broadcast communication configuration system.

FIG. 3 is a diagram of a passive remote sensing broadcast communication system configuration.

FIG. 4 is a flow chart showing a signal flow process for use in a passive remote sensor receiver broadcast communication configuration system.

FIG. 5 is a diagram of an active remote sensing telecommunications link communication system configuration.

FIG. 6 is a flow chart showing a signal flow process for use in an active remote sensor receiver telecommunications link configuration communication system.

FIG. 7 is a diagram of an active remote sensing telecommunications link communication system with relay configuration.

FIG. 8 is a flow chart showing a signal flow process for use in an active remote sensor receiver telecommunications link relay configuration.

FIG. 9 is a diagram of a passive remote sensing telecommunications link communication system configuration.

FIG. 10 is a flow chart showing a signal flow process for use in a passive remote sensor receiver telecommunications link configuration communication system.

FIG. 11 is a diagram of an passive remote sensing telecommunications link communication system with relay configuration.

FIG. 12 is a flow chart showing a signal flow process for use in a passive remote sensor receiver telecommunications link relay configuration.

FIG. 13 is a diagram of a remote modulation communication system configuration.

FIG. 14 is a flow chart showing a signal flow process for use in a remote modulation communication configuration system.

FIG. 15 is a diagram illustrating parameters useful for positioning the modulated ionized atmosphere for a communications system.

DETAILED DESCRIPTION

Example implementations of the disclosed scenarios are described with reference to the attached figures. The figures are not drawn to scale and they are provided merely to illustrate the instant invention. Several aspects are described below with reference to example applications for illustration. It should be understood that numerous specific details, relationships, and methods are set forth to provide a full understanding of the disclosed implementations. One having ordinary skill in the relevant art, however, will readily recognize that the invention can be practiced without one or more of the specific details or with other methods. In other instances, well-known structures or operation are not shown in detail to avoid obscuring the invention. The disclosed implementations are not limited by the illustrated ordering of acts or events, as some acts may occur in different orders and/or concurrently with other acts or events. Furthermore, not all illustrated acts or events are required to implement a methodology in accordance with the disclosed scenarios.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations.

That is if, X employs A; X employs B; or X employs both A and B, then "X employs A or B" is satisfied under any of the foregoing instances.

As used in this document, a statement that a device or system is "in electronic communication with" another device or system means that devices or systems are configured to send data, commands and/or queries to each other via a communications network. The network, for example, may be a wired or wireless network such as a local area network, a wide area network, an intranet, the Internet or another network.

A "computing device" refers to a computer, a processor and/or any other component, device or system that performs one or more operations according to one or more programming instructions.

The term "data" may refer to physical signals that indicate or include information. A "data bit" may refer to a single unit of data.

A "communication device" refers to a device that may include a processor and tangible, computer-readable memory. The memory may contain programming instructions in the form of a software application that, when executed by the processor, causes the device to perform one or more signal processing operations according to the programming instructions. A communication device, as used in this document, may be connected to power source and a radiation generator and include a data encoder and modulator. A communication device may also include or be in communication with an antenna to transmit electromagnetic radiation to a point in the atmosphere to ionize a region of the atmosphere in a modulated fashion, where the modulated region of the atmosphere is the communication medium.

The overall purpose of the embodiments described is to provide a means for data to be moved between two or more distant locations beyond line-of-sight. While several use cases and embodiments exist, the overall construct of each involves the use of remote sensing to detect a modulating target at some specified altitude. This modulating target either emits radiation in some form to be detected by a passive remote sensing device, or is detected by a signal transmitted from an active remote sensor to gain information about the target upon the return of the transmission to the active remote sensor. The modulating target is imprinted with data. The data may comprise, but is not limited to network timing data, navigation data, or any type of telecommunications within the internet of things. When the modulation of the target is detected by the remote sensor, the imprinted data is also captured and received.

The use of remote sensing in this process allows for data to be received without 'skipping', 'bouncing' or refracting the signal from one location to another. When a telecommunications signal is refracted to another location, significant signal attenuation over long distances occurs. There are several examples of processes where radio frequency signals are refracted off of some type of reflective surface in the sky. However, the use of pure reflection, as with active remote sensing, allows a radio frequency or visible/non-visible light signal to be received with much less attenuation over long distances. Additionally, refraction generally requires a consistently flat and tilted surface for signals to be successfully refracted to the intended distant location. Refraction requires better control, which translates into higher expense in gaining control. In contrast, reflection, used by active remote sensors does not require any particular shape for reflection to function properly. An example of this can be found in a police officer's RADAR gun. Speed is detected on trucks, cars, motorcycles, etc. The shape of the object does not matter for reflection. However, for refraction, the shape absolutely matters and becomes complicated quickly when trying to get the signal from one specific location to another specific location. With reflection, locations can be adjusted to anywhere within line-of-sight of the reflective target.

There are numerous types of radiation that can be used for creating atmospheric ionization, or for use in remote sensing. This disclosure describes, for example, the use of radio frequency. The benefits of radio frequency use are primarily in adverse weather survivability. While light used in LIDAR applications is widely used for various types of remote sensing applications, light cannot penetrate heavy weather at long distances. However, radio frequencies generally can. While other types of radiation may be used such as LASER light, x-rays, or any type of radiation across the entire electromagnetic spectrum, the microwave region of the electromagnetic spectrum tends to be the most beneficially radiation type for penetrating adverse weather conditions at long distances. However, in practice, the type of radiation employed may be scaled accordingly to produce the highest data rate possible.

In order to understand how a modulating target comprised of artificially induced ionization in the atmosphere can be produced, the following information defining ionization is provided. In order to understand ionization, it is important to review the properties of matter, specifically neutral gases. The following section describes in detail why RF, not light, is the practical approach for remotely sensing an artificially modulating ionized region of the atmosphere.

Matter is comprised of atoms. Atoms themselves are comprised of particles called protons, neutrons and electrons. Protons each have a single unit of charge, e, or $1.6 \times 10^{-19}$ Coulombs (C). Neutrons have no net charge, and electrons each have a single negative unit of charge, −e (−1.6×10-19 C). The protons and neutrons are tightly bound to each other through nuclear forces, and exist in an extremely small space at the center of the atom called the nucleus. Electrons exist orbiting around the nucleus, similar to planets orbiting around the sun, except instead of being attracted to the nucleus through gravity, they are attracted through electric forces, as electrons are charged negatively and the nucleus has a net positive charge. However, unlike planets around the sun, the electrons are confined to specific "orbitals" around the nucleus.

Each orbital corresponds to electrons with a specific amount of energy. In other words, all the electrons on a specific orbital have the same energy. Because of this, orbitals are sometimes referred to as "atomic energy levels", or "energy levels" for short. In order to transition from one energy level to a higher energy level, an electron must somehow receive an energy boost specifically equal to the difference in energy between the two orbitals. They may receive this boost in many ways, though the two most common ways are by a separate fast electron, not from the host atom, colliding with the atom and transferring some energy to an electron in a specific orbital (a process called electron collision excitation), or by absorption of a packet of electromagnetic radiation, also called a photon of light with exactly the right amount of energy. Likewise, when an electron transitions from a high energy level to a lower one, the host atom emits a photon (packet of light) with specifically the energy difference between the two energy levels. When an electron in a specific orbital gains enough energy (via collisions or light absorption) to excite it out of the host atom's highest energy level, the electron leaves the atom. The atom now has a net positive charge (as it lost one −e of charge from the departure of the electron), and is called an "ion". This process is called "ionization".

When two atoms physically join each other, they form a "molecule". Also like atoms, molecules can be ionized, forming "molecular ions". If a gas of neutral atoms and molecules is given energy, through heating for example, some of its constituent particles will gain enough energy, through collisions or other mechanisms, to achieve ionization. The gas will then be "partially ionized". Further heating will cause further ionization until all the particles in the original gas are fully ionized. The gas will then comprise free atomic nuclei and free electrons, and no net neutral particles.

A partially ionized gas (a gas of neutral atoms and molecules and some free ions and electrons) can act like two separate fluids if there are enough ionized particles. Given this information, a plasma is defined as a gas comprising a population of charged particles, typically free electrons and ions, sufficient enough to exhibit collective behavior. In the example given in the previous paragraph, the collective behavior would be sound waves. However, given the application, the collective behavior of interest can change, and as such, the definition of "plasma" is a "sufficiently" ionized gas.

In a partially ionized gas there are neutral particles and free electrons and ions. The number of any category of particle per unit volume is defined as the "density" of that particle. For example, air at atmospheric pressure contains of approximately $3 \times 10^{19}$ total particles (typically nitrogen, carbon dioxide, oxygen, and water molecules) per cubic centimeter ($cm^{-3}$). The partially ionized gases inside some regions of fusion experiments can contain densities of $10^{14}$ $cm^{-3}$ of neutral particles, $10^{13}$ $cm^{-3}$ of ions and $10^{13}$ $cm^{-3}$ of electrons. Typically, the densities of ions and electrons in a plasma are equal, and as such instead of referring to the specific ion or electron density, the term "plasma density" is often used as a substitute for either.

Electric fields emanate from charged particles. The value and direction of the field determines the electric force on any other charged particle in its presence. Magnetic fields are similar, but are only emanated by moving currents of charged particles, and natural magnetic materials. Magnetic fields only impart forces on moving charged particles. Electric fields that change magnitude and/or direction in time induce changing magnetic fields. Changing magnetic fields in turn, naturally induce changing electric fields. From this mechanism, an oscillating electric or magnetic field naturally propagates in space as an "electromagnetic wave".

Electromagnetic waves propagate in vacuum (such as space) at $3 \times 10^8$ m/s, regardless of the frequency or wavelength of the wave. Thus, the equation describing the speed of electromagnetic waves in vacuum is $f\lambda = c$, where f is the frequency of the wave in Hertz, or inverse seconds, $\lambda$ is the wavelength of the wave in meters, and $c = 3 \times 10^8$ m/s. Electromagnetic waves can exist at any frequency and wavelength. These waves occurring with wavelengths between $400 \times 10^{-9}$ to $800 \times 10^{-9}$ meters are called visible light, because they are detected by human eyes as colors. Longer wavelengths produce reddish colors and shorter wavelengths produce blueish colors. Other commonly known electromagnetic waves are those with wavelengths of approximately $10^{-11}$ meters, or X-rays, and waves with wavelengths on the order of a few meters are called radio waves.

Despite the fact that electromagnetic waves are continuous fluctuations in electromagnetic fields, their energy is only transmitted in discrete packets called photons. The energy of a single photon of an electromagnetic wave is given by the formula $E = hf$, where E is the energy of the photon in units of Joules, f is the wave frequency in Hertz, and h is called Planck's constant, and is equal to $6.626 \times 10^{-34}$ Joule-seconds. Thus a continuous electromagnetic wave of a single color, or frequency, like a red laser pointer or a single frequency radio transmitter, is a constant stream of photons, each with energy $E = hf$. Given this information we can say that oscillating electromagnetic fields are also known as light, though our eyes can only detect light between $400 \times 10^{-9}$ to $800 \times 10^{-9}$ meters in wavelength, and as such, we call this visible light. When electromagnetic radiation travels through a medium, air or water for example, it travels slower than it does in vacuum. The ratio of the speed of electromagnetic radiation in vacuum to that in a medium is called the "index of refraction", denoted n. Mathematically, this is expressed as $n = c/v$, where v is the velocity of the radiation in the medium with index of refraction n. Radiation travels more slowly in media than in vacuum because the individually charged particles that make up the medium (electrons in the atoms of water, for example) react to and affect the natural propagation of the electromagnetic wave, with the net effect of slowing down the wave. In the presence of certain media, strong magnetic fields can affect the speeds of different polarizations of electromagnetic waves, a phenomenon called the "Faraday effect". However in general, in the absence of specific media for the waves to travel through, constant background electric and magnetic fields do not affect the propagation of electromagnetic waves. The index of refraction or reflection of electromagnetic radiation off of a plasma is a complex function of the plasma density, temperature, composition, and the frequency and wavelength of the electromagnetic wave propagating in it. This leads to refraction and reflection of certain frequencies of electromagnetic radiation in certain plasmas.

Regarding reflection or refraction, when an electromagnetic wave (such as a light wave or a radio wave) travels through a medium, the electric and magnetic fields from the wave cause the charged particles in the medium (such as the electrons either free or bound to atoms) to oscillate due to the electric and magnetic forces previously discussed. As a result, some of the energy of the wave is delivered to the particles and the wave slows down. The amount of energy that is delivered to the particles depends on the wave frequency, and the frequency of natural oscillations of the medium.

When the frequency of the electromagnetic wave traveling in a plasma equals that of a characteristic plasma frequency the wave is either "resonantly absorbed" by the plasma, or is reflected. Resonant absorption is when all the wave energy is transferred into particle energy, and the wave ceases to propagate. Reflection is when the plasma reradiates the wave in a direction opposite to the wave's incoming direction. When the wave frequency is near but not equal to a characteristic plasma frequency, the wave is "refracted". Refraction is the process by which the particles reradiate the wave in a manner so as to change the direction of the incoming wave, but not to reflect it.

The details of whether or not an electromagnetic wave is absorbed, reflected or refracted by a medium is given by the medium's index of refraction, as introduced previously. The index of refraction is in general a function of the frequency and wavelength of the wave, and the characteristic frequencies of the medium the wave is traveling through. The process of electromagnetic wave reflection from plasmas in the ionosphere occurs when the wave frequency is near the plasma frequency ωp. In this region the index of refraction equals $n^2=(c/v)^2=1-\omega p^2/\omega^2$. Reflection occurs at frequencies where n=0, and absorption occurs where the wave frequency equals infinity. When $n^2$ is negative, the wave cannot physically propagate at those frequencies.

To find the condition where the wave is reflected is determined by setting the index of refraction to zero, and as such we have the condition that $1=\omega p^2/\omega^2$, or the wave frequency equals the plasma frequency. For a known wave frequency, complete reflection will occur at a plasma boundary where the plasma density fulfills the requirement that the plasma frequency, ωp, equals the wave frequency. The plasma frequency is only dependent on the plasma density, N. As such, the reflection condition is in essence a condition on the local plasma density. Rewriting this equation we can derive the critical density above which a wave of frequency f in megahertz (MHz) is reflected as $N_{crit}[cm^{-3}]=1.24\times10^4 f^2$ [MHZ].

In order to generate a plasma at atmospheric pressure, the local neutral gas must be ionized. The neutral gas includes primarily nitrogen, oxygen, carbon dioxide, and water vapor. Each atom in each molecule has anywhere from 1 to 8 electrons bound to it. The density of air molecules at atmospheric pressure is derived from the ideal gas law, which says that $N_{air}=p/kT$, where $N_{air}$ is the density of air, p is the air pressure, k is a constant called Boltzmann's constant, and T is the air temperature. Using standard values for p ($10^5$ Newtons per square meter), k ($1.38\times10^{-23}$ Joules per Kelvin), and T (300 Kelvin) $N_{air}=3\times10^{19}$ cm$^{-3}$. If the air is fully ionized up to 8 electrons will be released per each air atom, and there are up to 3 atoms per each air molecule (depending on the species of gas). Thus fully ionized air can have up to approximately 8 (electrons per atom)×3 (atoms per molecule)×$3\times10^{19}$ (molecules per cubic centimeter) for a total plasma density of $72\times10^{19}$ electrons per cubic centimeter in air. The maximum plasma density allowable in ideal conditions may allow, for example, for a 19 GHz radio wave to be reflected. However, in order to penetrate adverse weather conditions, radio waves within the microwave range are optimal and range from approximately 400 MHz-2.4 GHz. This frequency range remains high enough to prevent atmospheric ducting, but also low enough to prevent rain fade effects found in adverse weather. Previous experimentation has concluded that for increased reflectivity of ionized clouds, higher frequencies are more conducive.

While the premise of the process involves remote sensing of a modulating target, there are multiple use cases available, as well as, for example, positioning of components within each configuration. The positioning of components in each use case may be organized to maximize either overall distance of the telecommunications link created, or organized to reduce link latency, for example. The location of the transmission beam creating the atmospheric ionization may be completely vertical and perpendicular to the ground, or may be located at any angle above the ground. Based on the radiation used, the constraint on angle chosen may be aircraft. If aircraft are determined to be prohibited from flying through the beam path, completely vertical, in order to create a minimally sized no-fly zone may be the only reasonable angle for any use case configuration.

Subsequently, a detailed description of the figures will be provided. First, a detailed description of the major components of certain alternative embodiments comprising each figure will be described. Next, a description of the sub-components comprising the components will be provided, along with a detailed description of the signal flow of each Figure.

Radiation transmitter, 100 transmits radiation from a source into the atmosphere capable of ionizing a selected region of the atmosphere as selected in altitude by the user. Altitude of ionization may be accomplished by, but is not limited to beam forming techniques, which may be accomplished, for example, through phased array antenna methods, or through the crossing of two or more like radiation sources in order to create a region of atmospheric ionization for the purpose of detection by either an active or passive remote sensing receiver.

Referring now, to the sub-components comprising radiation transmitter, 100. There are seven primary sub-components, which include; power source, 110; radiation generator, 120; information inputs from the central processing unit (CPU), 130; data encoder, 140; modulator, 150; high-power amplifier, 160; transmitting antenna, 170.

Power source, 110 is defined as a device providing electrical power to the radiation transmitter, 100 for the purpose of the electrical power to be converted to electromagnetic energy, forming the basis for the modulated radiation transmission, 200.

Radiation generator, 120 is defined as a device used to convert the electrical power provided from the power source, 110 into electromagnetic energy. The radiation generator, 120 is utilized for the creation of radiation used in one of two ways. The first involves the creation of ionized atmosphere. This radiation may comprise any frequency favorable to the creation of ionized atmosphere for the purpose of either serving as a reflective surface for an active remote sensor, or for an adequate radiation emission to be received by a passive remote sensor. The second purpose of the radiation generator, 120 is for use in the creation of the transmission output, 500.

Information inputs from the central processing unit (CPU), 130 are defined as the intended information the user of the system wishes to provide to another user or users at another distant location. The information inputs from the CPU, 130 may comprise any type of information input by the user, and converted into a variety from many different types of media, for example, within the Internet of Things. The Information inputs from the CPU, 130 may be a computing device or other electronic device capable of performing the methodologies described in this document. A Computing Device providing the Information inputs from the CPU, 130 may have a system interface, a user interface, a CPU, a system bus, a memory connected to and accessible by other portions of controller through system bus, and hardware entities connected to the system bus. At least some of the hardware entities perform actions involving access to and use of memory, which can be a random access memory (RAM), a disk driver and/or a compact disc read only memory (CD-ROM). Some or all of the listed components can be implemented as hardware, software and/or a combination of hardware and software. The hardware may include, but is not limited to, an electronic circuit. The CPU, 130 may include more, less or different components than those illustrated in FIGS. 2, 4, 6, 8, 10, 12, 14. However, the components shown are sufficient to disclose an illustrative embodiment implementing scenarios described in the present disclosure. Hardware entities can include microprocessors, application specific integrated circuits (ASICs) and other hardware. In this regard, it should be understood that the microprocessor can access and run various software applications installed on the CPU, 130. The hardware entities can include a disk drive unit comprising a computer-readable storage medium on which is stored one or more sets of instructions (e.g., software code or code sections) configured to implement one or more of the methodologies, procedures, or functions described in this document. The instructions can also reside, completely or at least partially, within the memory and/or within the CPU 130 during execution thereof by the controller. The memory and the CPU, 130 also can constitute machine-readable media. The term "machine-readable media", as used here, refers to a single medium or multiple media (e.g., a centralized or distributed database, and/or associated caches and controllers) that store the one or more sets of instructions. The term "machine-readable media", as used here, can also refer to any medium that is capable of storing, encoding or carrying a set of instructions for execution by the controller and that cause the controller to perform any one or more of the methodologies of the present disclosure.

Data encoder, 140 is a device used to convert the Information inputs from the CPU, 130 provided into a format able to be modulated within the modulated radiation transmission, 200.

Modulator, 150 is a device used to allow for information to be embedded within the modulated radiation transmission, 200. Modulation may be achieved in a range of ways. For instance, on/off keying which effectively turns the modulating ionized atmosphere, 300 on or off, which can be remotely sensed. Also, modulation may also include amplitude modulation, where the power used to create the modulating ionized atmosphere, 300 may be adjusted up or down in order to change the reflectivity of the modulating ionized atmosphere, 300.

High-power amplifier, 160 is a device used to increase the power of the electromagnetic energy provided from the power source, 110 to increase the amplitude of the voltage or current signal, in order to allow for the creation of Modulated Ionized Atmosphere, 300.

Transmitting antenna, 170 is an exemplary device used to produce the modulated radiation transmission, 200. The construct of the transmitting antenna, 170 for use in this system is considered to be a phased array. The purpose of using a phased array in the radiation transmitter, 100 system is for the creation of beam-forming to focus the electromagnetic energy into a specific area in order to produce modulated ionized atmosphere, 300. Phased arrays also allow for the modulated radiation transmission, 200 to be moved to a specified location and altitude in the atmosphere. If space is limited for implementation of the radiation transmitter, 100 location, then more power may need to be applied in order to create an appropriate ionization density. Conversely, if infrastructure in the surrounding area of the radiation transmitter, 100 is sensitive to potential electromagnetic interference of other systems, then the number of phased array antennas comprising the transmitting antenna, 170 may be increased, in order to increase antenna gain and reduce the power requirement.

Modulated radiation, 200 is defined as the medium where information is transmitted to the atmosphere via the radiation transmitter, 100 as described above. The purpose of the modulated radiation, 200 is to create a detectable signature in the atmosphere that serves as a communication medium to be detected by either an active or passive remote sensor for the passing of information from one location to another.

Modulating ionized atmosphere, 300 is defined as the product of the transmitted radiation, 100 causing a specified region of the atmosphere to be ionized. This modulated region of ionized atmosphere is detectable by either an active or passive remote sensor from another distant location. The ionization is intended to create either a reflective surface for an active remote sensor to detect the modulation of the ionization, in order to initiate the information transfer process or for creating a radiation emission, which can be detected by a passive remote sensor. In both cases, the modulating ionized atmosphere, 300 is created at one location, where it is modulated with information, and remotely sensed from one or more other locations for the purpose of detecting the modulation and converting it into usable information.

A remote sensor transmitter, 400 is defined as a device able to transmit a radiation signal towards a modulating ionized atmosphere, 300 region, in order to contact the the modulating ionized atmosphere, 300 for the purpose of having that same signal reflected completely back towards the originating location to be received.

Referring now to the exemplary sub-components comprising remote sensor transmitter, 400. There are four primary sub-components, which include; power source, 410; radiation generator, 420; high-power amplifier, 430; transmitting antenna, 440.

Power source, 410 is defined as a device providing electrical power to the remote sensor transmitter, 400 for the purpose of the electrical power to be converted to electromagnetic energy, forming the basis for the transmission output, 500.

Radiation generator, 420 is defined as a device used to convert the electrical power provided from the power source, 410 into electromagnetic energy. The radiation generator, 420 is utilized for the creation of radiation used in one of two ways. The first involves the creation of ionized atmosphere. This radiation may comprise any frequency favorable to the creation of ionized atmosphere for the purpose of either serving as a reflective surface for an active remote sensor, or for an adequate radiation emission to be received by a passive remote sensor.

High-power amplifier, 430 is a device used to increase the power of the electromagnetic energy provided from the power source, 410 to increase the amplitude of the voltage or current signal, in order to reach the modulated ionized atmosphere, 300 and be reflected.

Transmitting antenna, 440 is an exemplary device used to produce the transmission output, 500. The construct of the transmitting antenna, 440 for use in this system is considered to be a phased array. The purpose of using a phased array in the remote sensor transmitter, 400 component is for the creation of beam-forming to focus the electromagnetic energy into a specific area in order to reach and make contact with the modulated ionized atmosphere, 300 and be reflected.

Transmission output, 500 is defined as the radiation signal originating from the remote sensor transmitter, 400. The ideal characteristics of this radiation signal may include for instance a signal which may have the best perclavity for penetrating adverse weather conditions, in order to increase overall link reliability. The radiation may include, but is not limited to the microwave frequency range from 400 MHz to 2.4 GHz, where severe atmospheric conditions including but not limited to rain, fog, snow, and dust may prevent a radiation signal from adequately detecting the modulating ionized atmosphere, 300 region.

The modulated radiation return signal input, 600 is defined as the reflected transmission output, 500 that has been completely reflected and is now returning towards its point of origin. The difference between the original transmission output, 500 and the modulated radiation return transmission to remote sensor receiver, 600 is that this return signal now carries the modulated information that has been imprinted onto the return transmission after making contact with the modulating ionized atmosphere region, 300.

The remote sensor receiver, 700 is defined as the device where the modulated radiation return signal input, 600 returns to upon its full reflection off of the modulating ionized atmosphere, 300.

Referring now, to the exemplary sub-components comprising the remote sensor receiver, 700. There are four primary sub-components, which include; remote sensor receiver, 710; demodulator, 720; data decoder, 730; information output, 740.

Receiver, 710 is defined as a device which receives the modulated return signal input, 600. The receiver, 710 may also include, for example, a phased antenna array or a parabolic antenna or multiple such antennae.

Demodulator, 720 is defined as a device which strips the imprinted modulation from the modulated return signal input, 600. The stripping of the imprinted modulation is the first step in converting the modulation into the information intended by the user from the radiation transmitter, 100 location.

Data decoder, 730 is defined as a device used to convert the imprinted modulation now stripped from the modulated return signal input, 600 into digital information.

Information output, 740 is the final product of the process, where the information inputs from the CPU, 130 from the radiation transmitter location, 100 has now been received by the user at the remote sensor receiver, 700 location.

Figure 13:
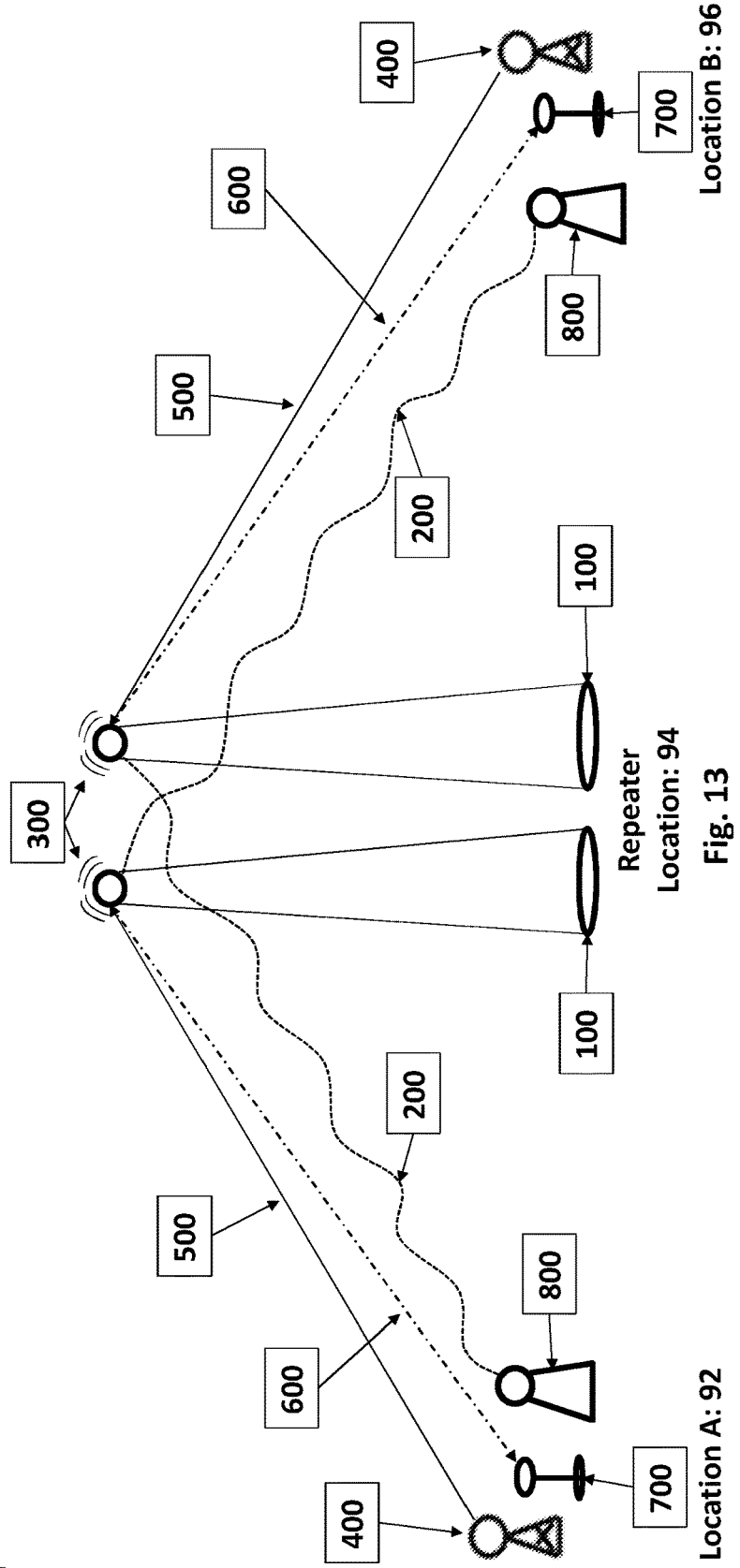
Figure 14:
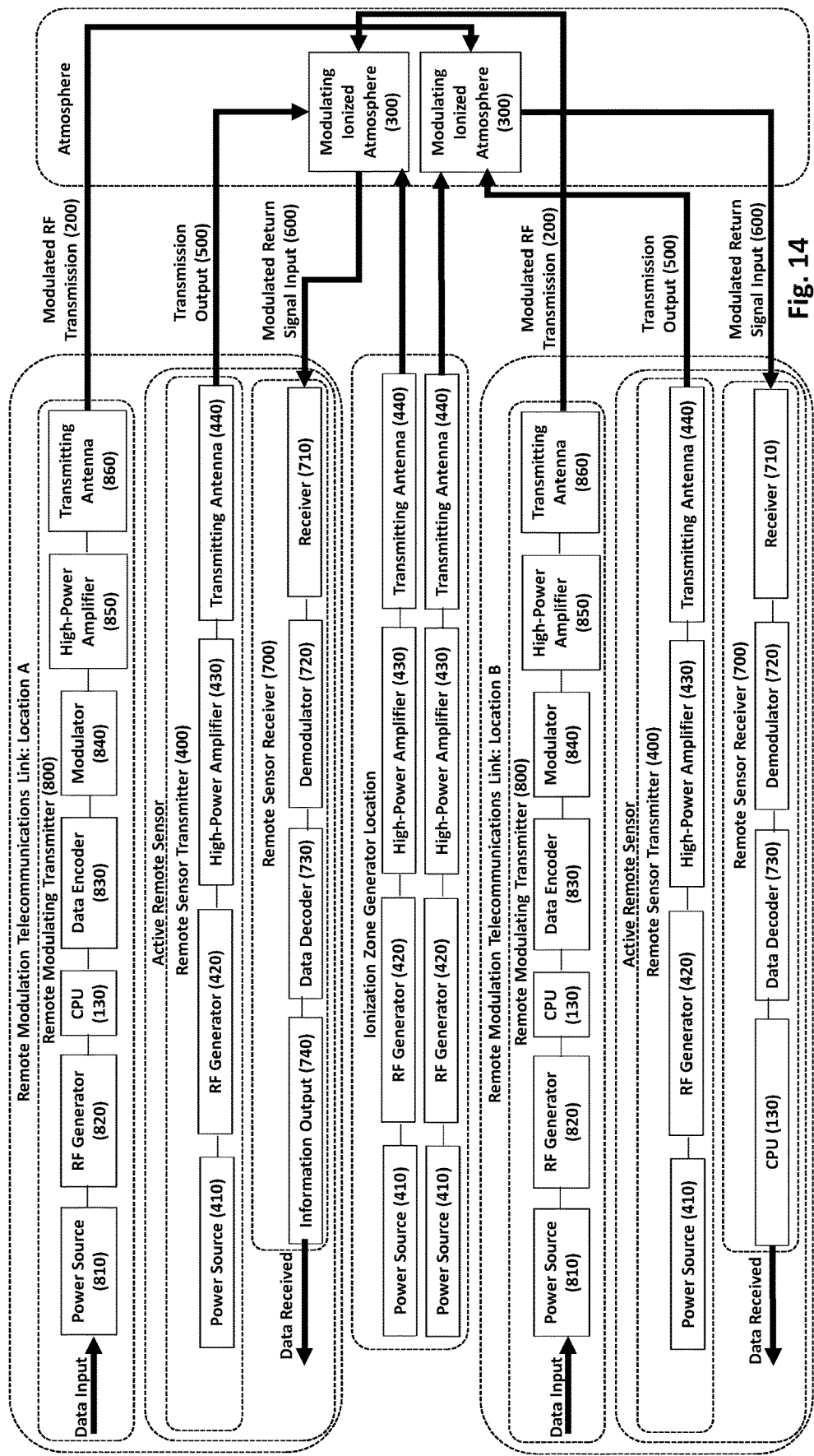

The remote modulating transmitter, 800 is defined as the device utilized in FIG. 13, where additional radiation from a transmitting location is inserted into an already existing region of ionized atmosphere for the purpose of creating modulation for active remote sensor detection at another distant location. The purpose for this method is to create an opportunity for extending range of the link.

Referring now to FIG. 1, an embodiment of an active remote sensing communication system 10 is shown. Communication system 10 is shown in FIG. 1 as having, for example, one broadcast site 12, and multiple receiver locations, 14, 16, 18, 20. Only four receiver locations are shown for simplicity of description, however the scenarios described in this document are not limited in this regard. One skilled in the art will recognize that communication system 10 may have any number of receiver locations. Receiver locations 14, 16, 18, 20 are also shown as having similar or identical features. The scenarios described in this document are also not limited in this regard. Broadcast locations, or receiver location may be suitable to implement the disclosed scenarios without have identical, or even similar, sets of equipment.

Referring now to FIG. 1 depicting a half-duplex, active remote sensing broadcasting construct. From the radiation transmitter, 100 a modulating electromagnetic transmission is projected into the atmosphere at a specified location and altitude determined by the user. Referring now to the modulated radiation transmission, 200 where the electromagnetic energy emitted from the radiation transmitter, 100 is projected into the atmosphere in a focused manner, in order to create modulating ionized atmosphere, 300. This modulation is the basis for the flow of information provided by the user at the radiation transmitter, 100. The modulated radiation transmission, 200 culminates in an area of modulating ionized atmosphere, 300. The purpose for producing an area of ionization is for an active remote sensor at another distant location, such as locations A, B, C, D to be able to detect this modulating region of ionized atmosphere, 300. The modulating ionized atmosphere, 300 may be modulated in a range of ways. For instance, on/off keying which effectively turns the modulating ionized atmosphere, 300 on or off, which can be remotely sensed. Also, modulation may also include amplitude modulation, where the power used to create the modulating ionized atmosphere, 300 may be adjusted up or down in order to change the reflectivity of the modulating ionized atmosphere, 300. Turning now to locations A, B, C, D which are comprised of both a remote sensor transmitter, 400 and remote sensor receiver, 700 pair. The remote sensor transmitter, 400 emits a transmission output, 500 of electromagnetic energy towards the modulating ionized atmosphere, 300 for the purpose of making contact with it. Once contact with the modulating ionized atmosphere, 300 is made, the electromagnetic energy is reflected back towards the location it originated from, such as A, B, C, D. The reflected signal is the modulated return signal input, 600. The modulated return signal input, 600 is now imprinted with the modulation from the modulating ionized atmosphere, 300. The modulated return signal input, 600 returns to the remote sensor receiver, 700. At the remote sensor receiver, 700 the modulation is stripped from the transmission where it is converted into an information output from the CPU, 130. At this point, the process is complete and the information input into the CPU, 130 from the radiation transmitter, 100 has now been received at the other distant locations A, B, C, D.

Figure 2:
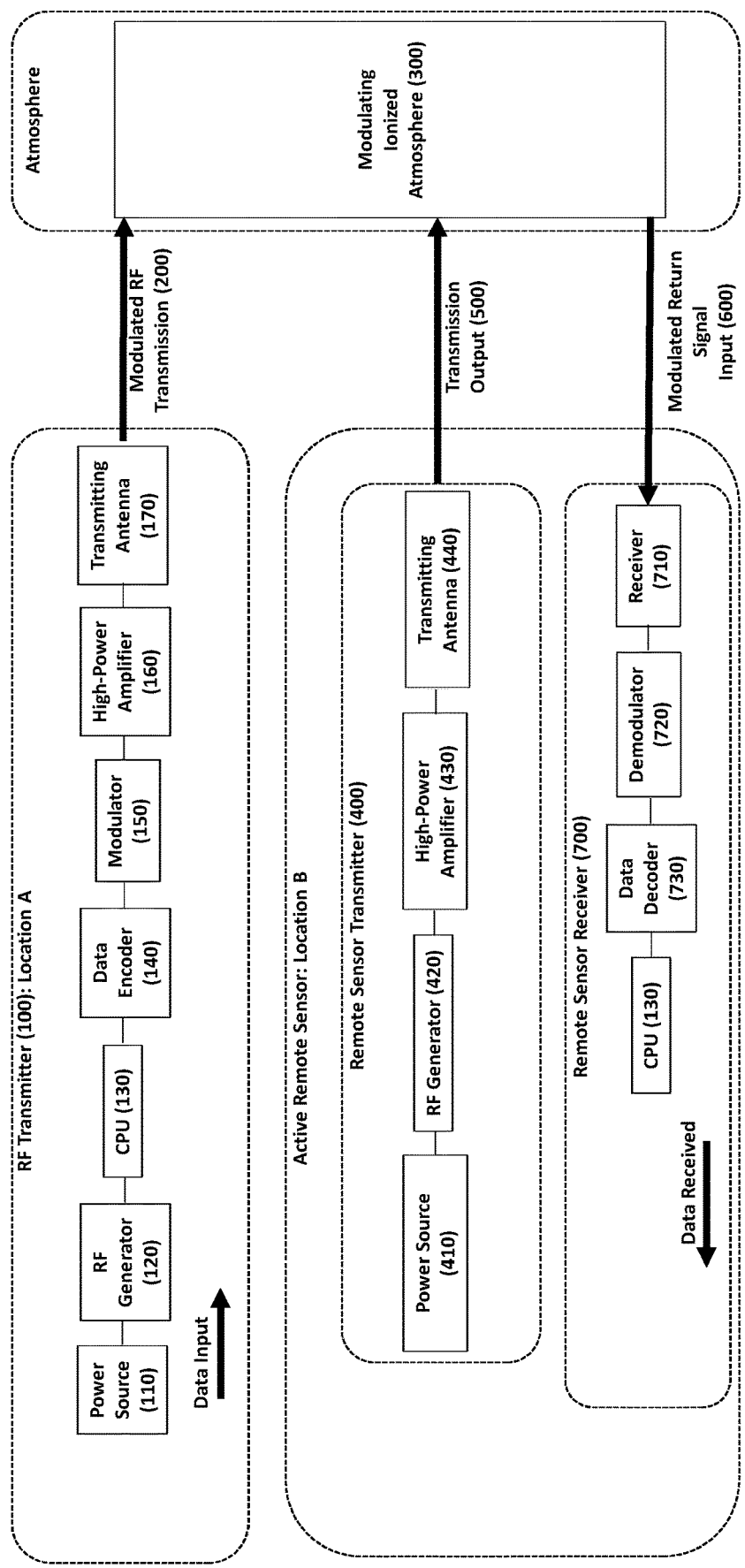

Referring now to FIG. 2, which is a block diagram of FIG. 1. Beginning with the radiation transmitter, 100, this component is comprised of seven sub-components; power source 110; radiation generator, 120; information inputs from the CPU, 130; data encoder, 140, modulator, 150, high-power amplifier, 160, transmitting antenna, 170. The power source, 110 produces electromagnetic energy. The purpose of this electromagnetic energy is provided for the creation of an electromagnetic transmission. In order to produce the energy required to ionize a region of the atmosphere for the purpose of creating a reflective surface for the passing of information from one location to another, a power level value between 1-10 MW may be used. This power range is dependent upon the altitude where the ionization of the atmosphere is set to occur, since altitude has a direct correlation with the critical density of ionization that may be allowed to occur based on the density of air at a specified altitude. The power source, 110 is also directly correlated to the number of phased array antennas used to increase the gain and beam-forming capability of the transmission, in order to produce ionization at a specified altitude. If space is limited for implementation of the radiation transmitter, 100 location, then more power may need to be applied in order to create an appropriate ionization density. Conversely, if infrastructure in the surrounding area of the radiation transmitter, 100 is sensitive to potential electromagnetic interference of other systems, then the number of phased array antennas comprising the transmitting antenna, 170 may be increased, in order to increase antenna gain and reduce the power requirement. A radiation generator, 120 may be used to convert the electromagnetic energy from the power source, 110 into a format capable of forming the modulated radiation transmission, 200.

Information inputs from the CPU, 130 are added. Information inputs from the CPU, 130 may originate from any computing device or other electronic device capable of performing the methodologies described in this document, including a notebook personal computer ("PC"), a laptop PC, a personal data assistant (PDA), a smart phone, a tablet, a desktop PC, a server, and the like. A data encoder, 140 may be used to convert the Information inputs from the CPU, 130 into a format able to be modulated within an electromagnetic transmission. The modulator, 150 receives the encoded data to be modulated within the modulated radiation transmission, 200. The modulation technique used may be, for example, an on/off keying construct or amplitude modulation. On/off keying modulation creates a scenario where the modulating ionized atmosphere, 300 is turned on and off in a pattern to represent the information inputs, 110. Amplitude modulation creates a scenario where the reflectivity of the modulating ionized atmosphere, 300 again creating a pattern representing the information inputs, 110. A high-power amplifier, 160 is used to increase the power of the transmission, in order to produce the modulating ionized atmosphere, 300 which may involve either voltage or current strength.

As mentioned earlier, it is anticipated that the power required to produce modulating ionized atmosphere, 300 may utilize a power level value range of 1-10 MW. This power range is an estimate discerned from live environment testing using power ranging from 3.6-10 MW to produce atmospheric ionizing effects. The transmitting Antenna, 170 is used to create the modulated radiation transmission, 200, which in turn results in the creation of the modulating ionized atmosphere, 300. The transmitting antenna, 170 is comprised of a phased array. The purpose for using phased array antennas is to allow for antenna gain to be created to a sufficient value without the cost of building large parabolic dishes in excess of 60 meters. Phased array antennas also allow for beam-forming used to focus the energy from the modulated radiation transmission, 200 into a small area in order to produce the modulating ionized atmosphere, 300. By adding individual antennas to a planar array, beam-forming improves. In order to reduce the area required for potentially thousands of individual elements, higher frequencies are used for the modulated radiation transmission. The size of an individual antenna element in a phased array is half of the wavelength in a dipole antenna design. For example, if a frequency, f is given as 1 MHz, traveling at the speed of light, 300,000,000 m/s, then the wavelength, λ is given as 0.3 m. In comparison, phased array antennas may be used that are high-frequency antennas several meters long to facilitate the 2.8-10 MHz adjustable operating range. In addition, using frequencies between 400-2400 MHz can increase performance through adverse weather, as well as produce a higher data rate, in accordance with Nyquist's Limit for the passing of information from the radiation transmitter, 100 to the remote sensor receiver, 700.

The remote sensor transmitter, 400 is, for example, comprised of four sub-components; power source, 410; radiation generator, 420; high-power amplifier, 430; transmitting antenna, 440. The equipment string comprising the remote sensor transmitter, 400 is similar to the radiation transmitter, 100 with the exception of the information inputs from the CPU, 130; data encoder, 140; modulator, 150. The purpose of the remote sensor transmitter, 400 is to produce an electromagnetic transmission capable of reaching and making contact with the modulating ionized atmosphere, 300. The characteristics of the transmission output, 500 produced by the remote sensor transmitter, 400 are; wavelength (λ), gain (G), transmitted power (Ps), minimum power received ($P_E$), and area of modulating ionized atmosphere, 300 (σ). Utilizing the RADAR range equation, $$R = \sqrt[4]{\frac{P_S G^2 \lambda^2 \sigma}{P_E (4\pi)^3}}$$ Equation (1)

For example, for certain embodiments the modulated radiation transmission, 200 to reach the modulating ionized atmosphere, 300 and for the modulated return signal input, 600 to be adequately received at the remote sensor receiver, 700 at a distance of 500 km, with the values of Ps=700 kW, G=35 dB, λ=300, σ=20 m², $P_E$=−100 dBm are required. These values fall within a realistic range of existing equipment strings that can fulfill the system's purpose. Also, keeping in mind that the variables will fluctuate according to whether the user has a requirement for overall distance or has a requirement for lower latency.

Once the modulated return signal input, 600 is received at the remote sensor receiver, 700 the process of stripping the information from the transmitted signal begins. The remote sensor receiver, 710 may be, for example, a parabolic design or be a planar phased array configuration. From the remote sensor receiver, 710 the electromagnetic transmission enters the demodulator, 720 where the modulation is stripped from the electromagnetic transmission. From the demodulator, 720 the stripped modulation is converted into a digital format by the data decoder, 730. From the data decoder, 730 the data is now accessible as the information output from the CPU, 130. The connections used throughout FIG. 2 may be any electronic connection that allows the transfer of data to any of the devices including Ethernet cables, IEEE 802.11 wireless connections ("Wi-Fi"), fiber optic cables, IEEE 1394 cables ("Firewire"), universal serial bus (USB), and the like. Scenarios of the disclosed implementations are not limited in this regard.

Figure 3:
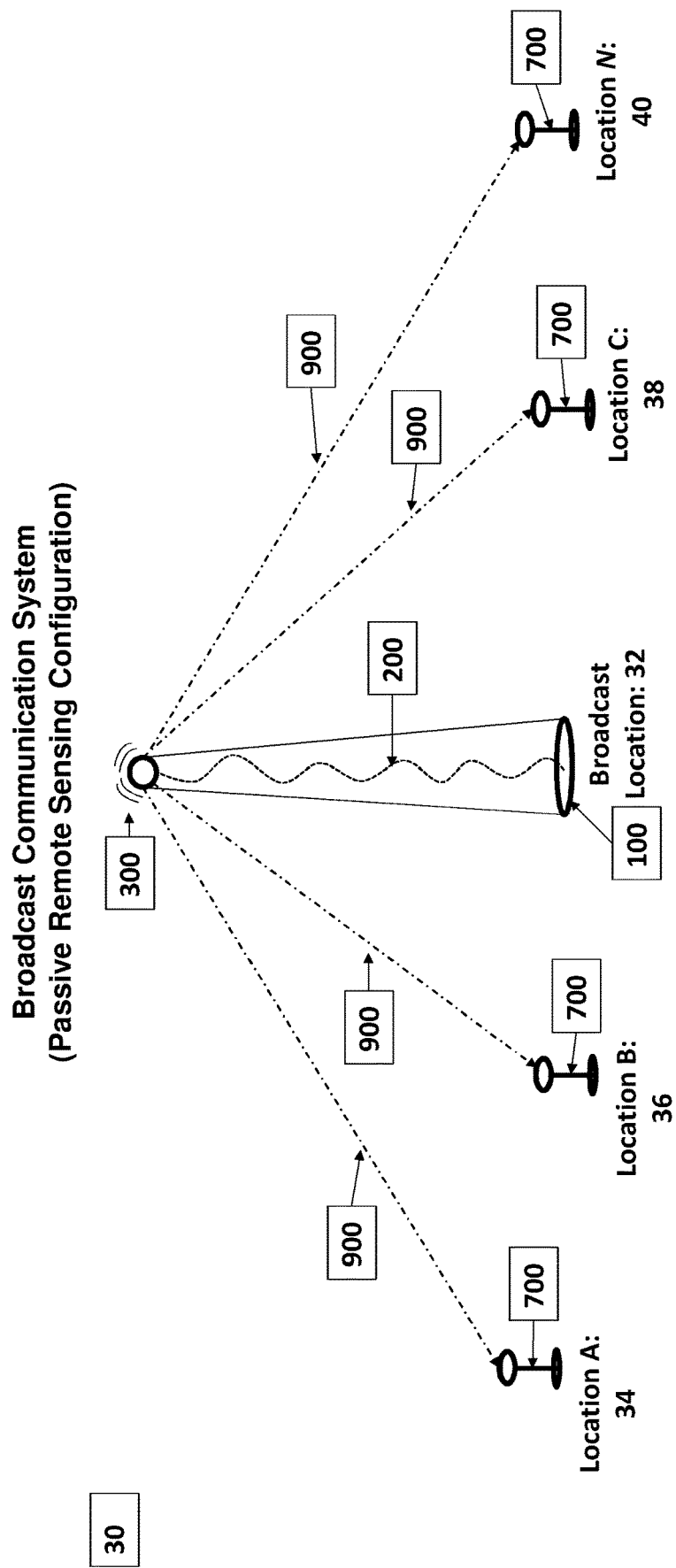

Referring now to FIG. 3 depicting a half-duplex, passive remote sensing broadcasting construct. From the radiation transmitter, 100 a modulating electromagnetic transmission is projected into the atmosphere at a specified location and altitude determined by the user. Referring now to the modulated radiation transmission, 200 where the electromagnetic energy emitted from the radiation transmitter, 100 is projected into the atmosphere in a focused manner, in order to create modulating ionized atmosphere, 300. This modulation is the basis for the flow of information provided by the user at the radiation transmitter, 100. The modulated radiation transmission, 200 culminates in an area of modulating ionized atmosphere, 300. The purpose for producing an area of ionization is for an active remote sensor at another distant location, such as locations A, B, C, D to be able to passively detect the modulating ionized atmosphere, 300. The modulating ionized atmosphere, 300 may be modulated in a range of ways. For instance, on/off keying which effectively turns the modulating ionized atmosphere, 300 on or off, which can be remotely sensed. Also, modulation may also include amplitude modulation, where the power used to create the modulating ionized atmosphere, 300 may be adjusted up or down in order to change the reflectivity of the modulating ionized atmosphere, 300. Turning now to locations A, B, C, D which is comprised of a remote sensor receiver, 700 only. At the modulating ionized atmosphere, 300 passive electromagnetic energy radiating from the modulating ionized atmosphere, 300 is remotely sensed by the remote sensor receiver, 700 at locations A, B, C, D. The passive signal is the modulated passive signal input, 900. The modulated passive signal input, 900 is imprinted with the modulation from the modulating ionized atmosphere, 300. The modulated passive signal input, 900 is received at the remote sensor receiver, 700. At the remote sensor receiver, 700 the modulated passive signal input, 900 is converted into an information output, 740. At this point, the process is complete and the information input from the CPU, 130 from the radiation transmitter, 100 has now been received at the other distant locations A, B, C, D.

Figure 4:
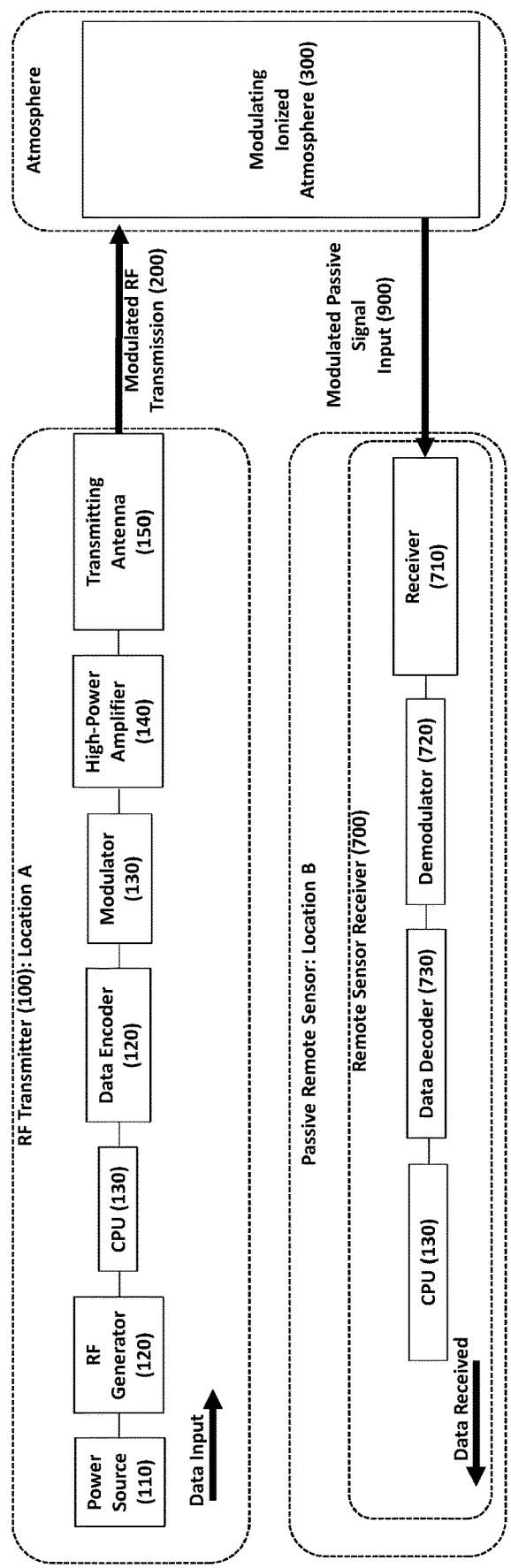
Figure 5:
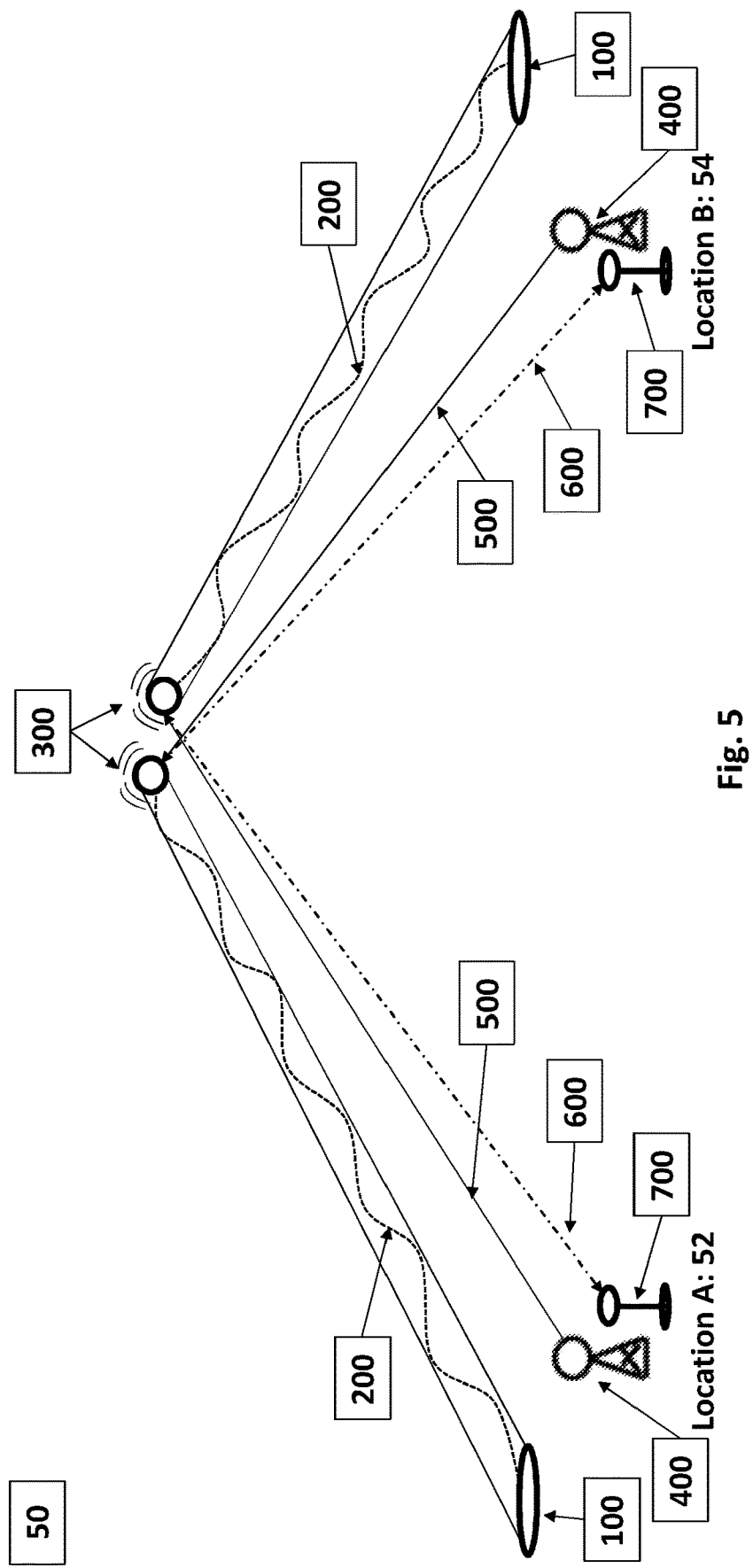
Figure 6:
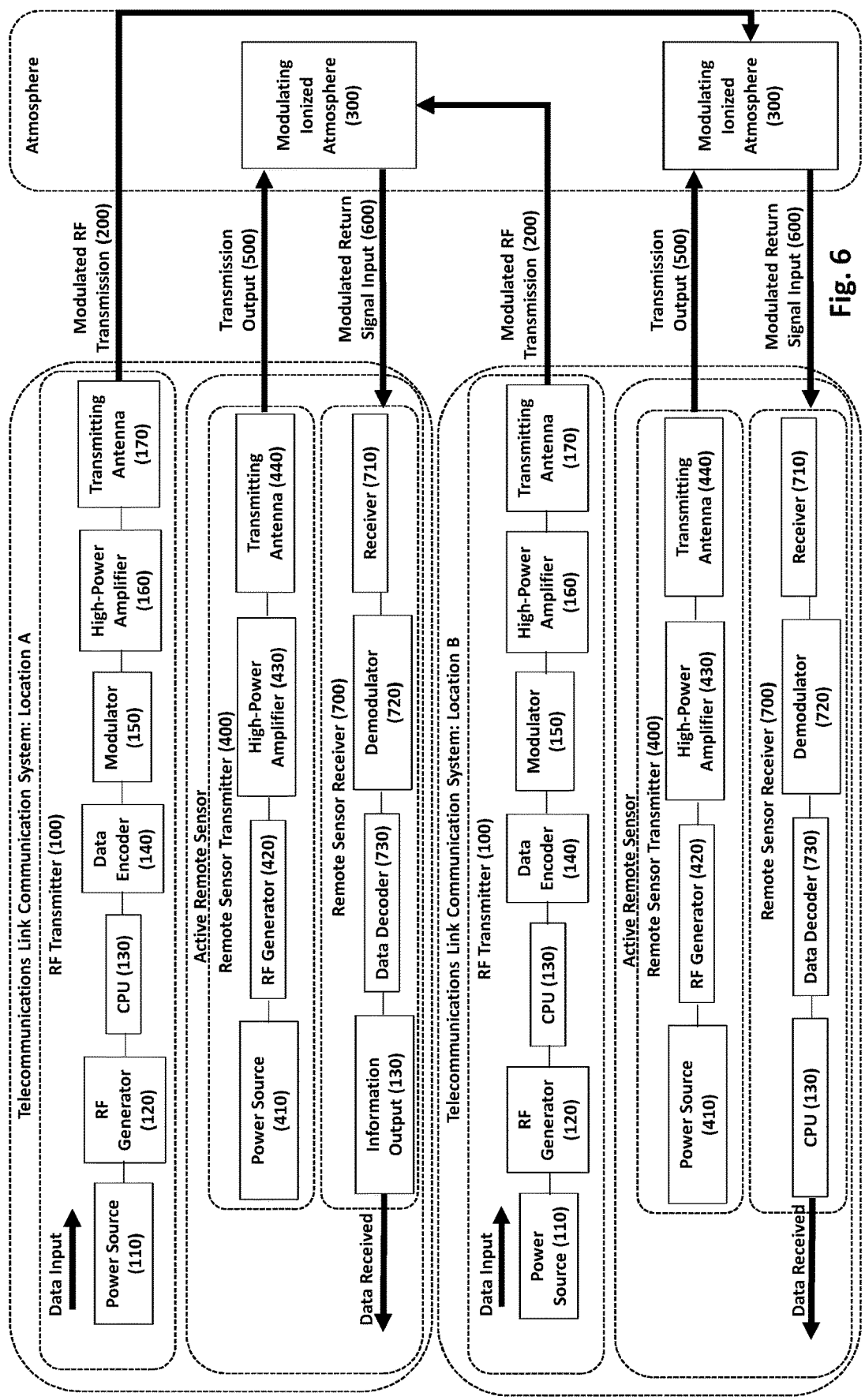
Figure 7:
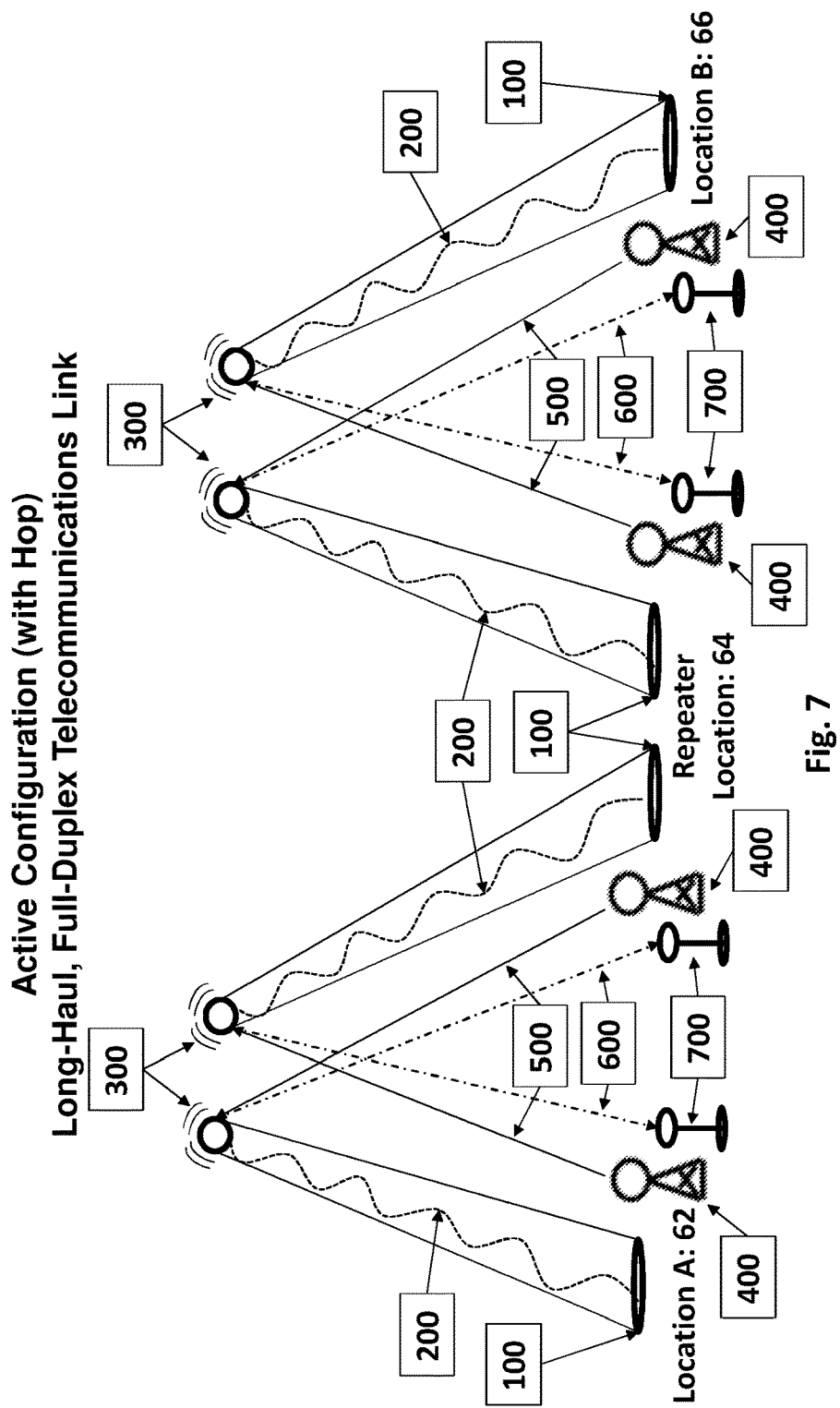
Figure 8:
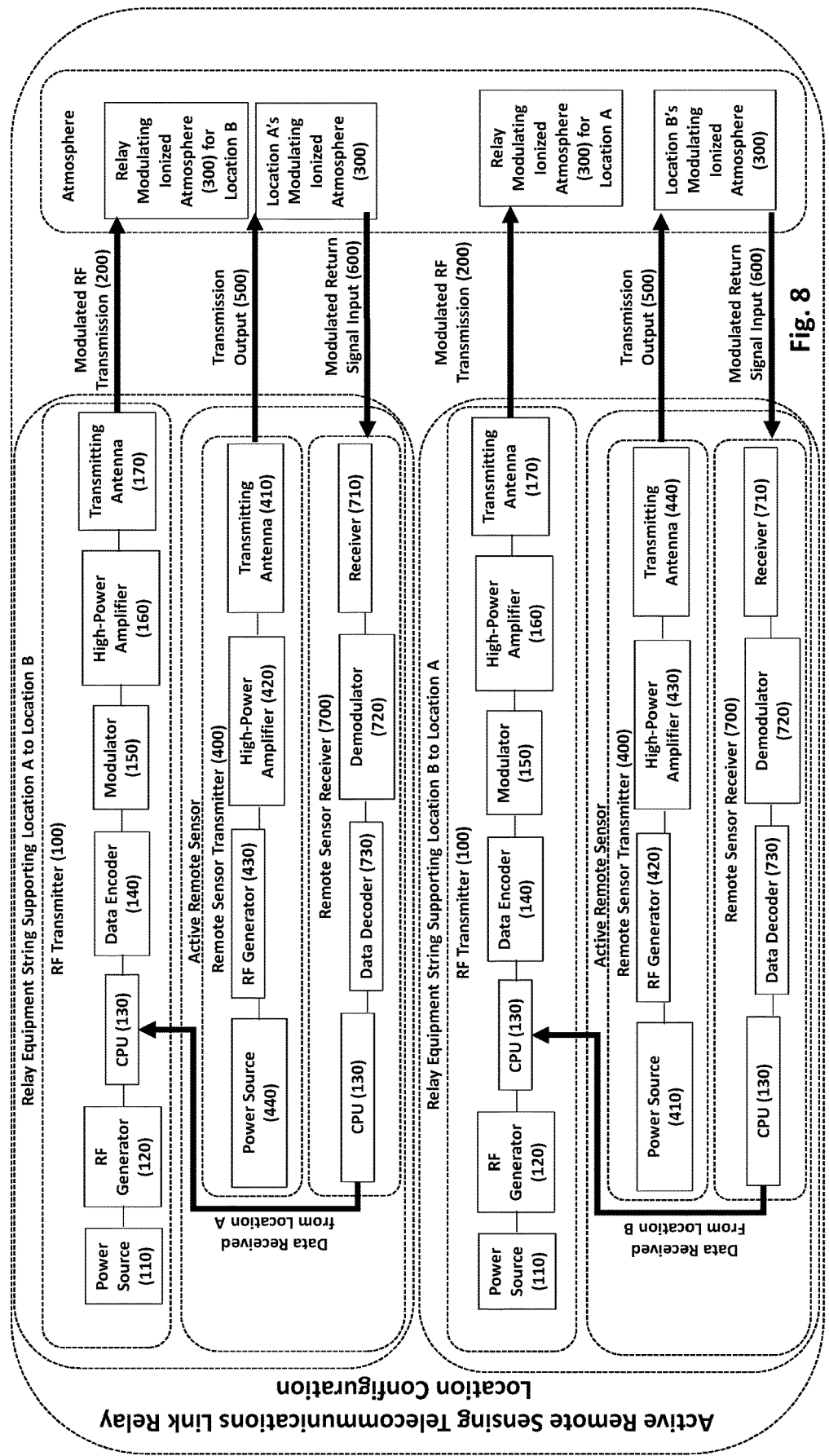
Figure 9:
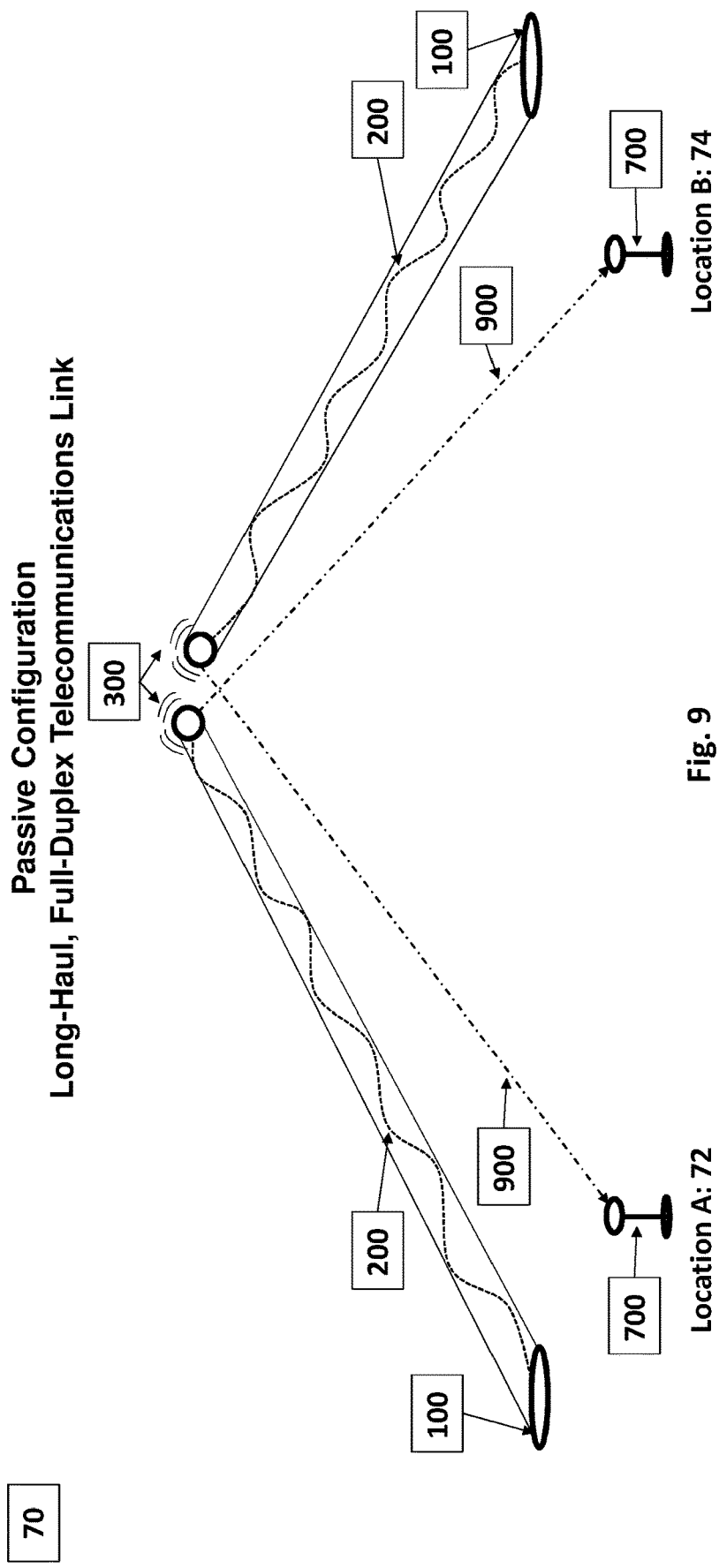
Figure 10:
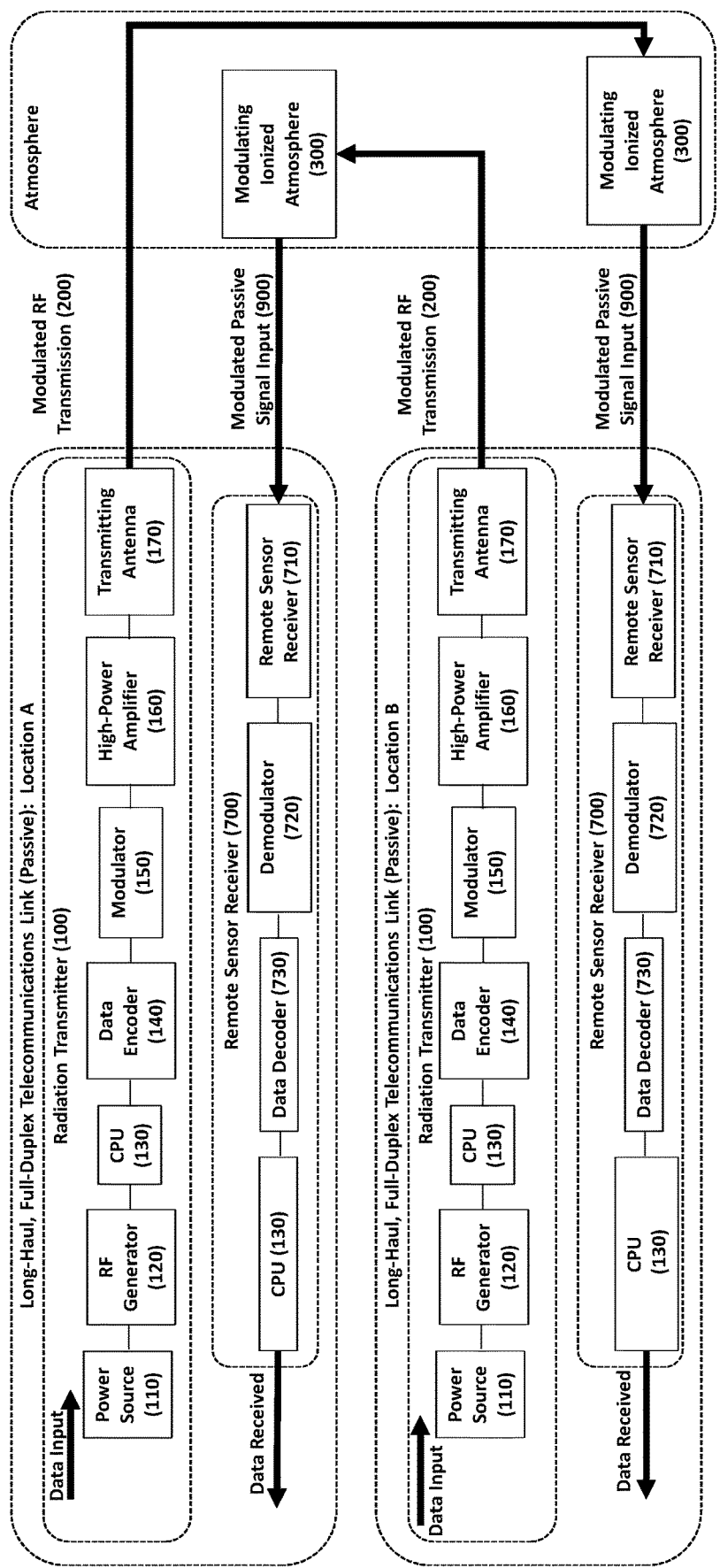
Figure 11:
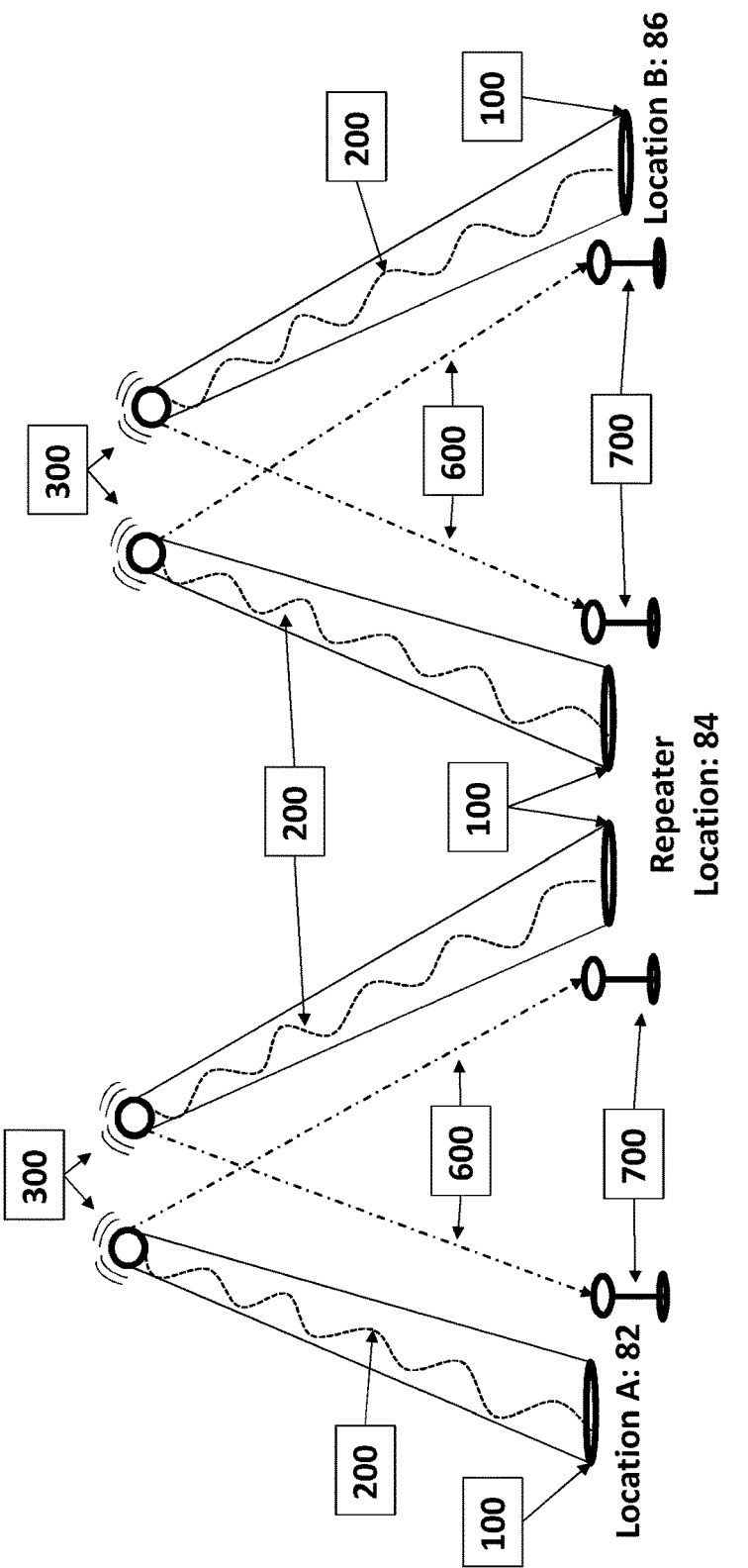
Figure 12:
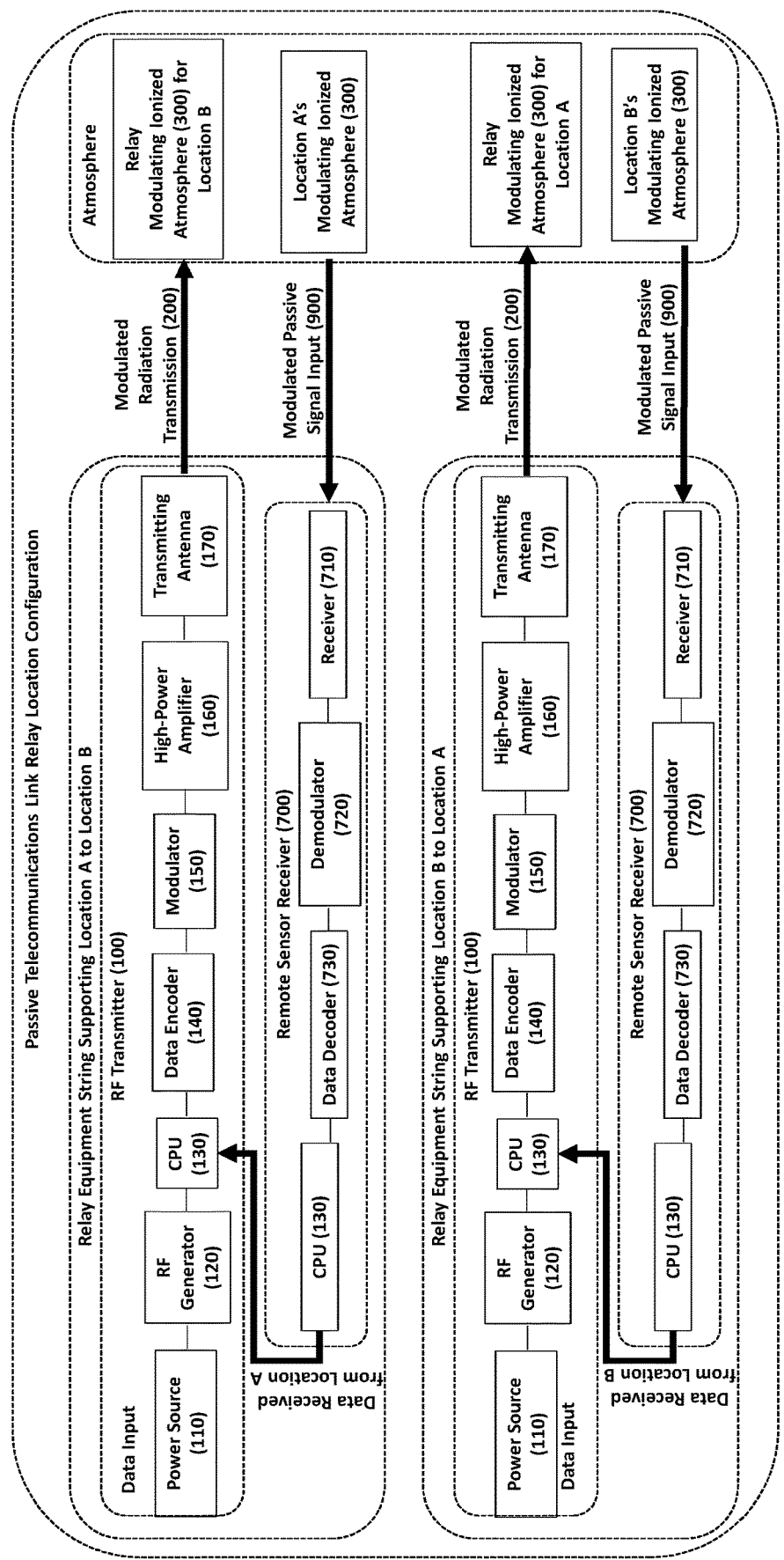

Referring now to FIG. 4, along with the radiation transmitter, 100, this component comprises, for example, seven sub-components; power source 110; radiation generator, 120; information inputs from the CPU, 130; data encoder, 140, modulator, 150, high-power amplifier, 160, transmitting antenna, 170. It should be noted that the equipment string detailed for the radiation transmitter, 100 in FIG. 2 can be identical to the radiation transmitter noted here in FIG. 4. In the interest of preventing unnecessary repetition of identical equipment descriptions and characteristics, the sub-component description along with the modulation characteristics of the modulating ionized atmosphere, 300 for FIG. 4 have been omitted here, but may be referenced in the detailed description for FIG. 2. The modulated passive signal input, 900 is characterized as electromagnetic energy emanating from the modulating ionized atmosphere, 300, in which it may be detected by a passive remote sensor receiver, 700. Once the modulated passive signal input, 900 is received at the remote sensor receiver, 700 the process of stripping the modulation from the received signal begins. The remote sensor receiver, 710 may be, for example, a parabolic design or be a planar phased array configuration. From the remote sensor receiver, 710 the electromagnetic transmission enters the demodulator, 720 where the modulation is stripped from the electromagnetic transmission. From the demodulator, 720 the stripped modulation is converted into a digital format by the data decoder, 730. From the data decoder, 730 the data is now accessible as the information output, 740. The connections used throughout FIG. 4 may be any electronic connection that allows the transfer of data to any of the devices including Ethernet cables, IEEE 802.11 wireless connections ("Wi-Fi"), fiber optic cables, IEEE 1394 cables ("Firewire"), universal serial bus (USB), and the like. Scenarios of the disclosed implementations are not limited in this regard.

Because modulating ionized atmosphere region, 300 can be at some distance above ground level and can be observed via either active remote sensing or passive remote sensing at a much further distance than a ground based signal which may be disrupted by the curvature of the earth. Additionally, the height at which modulating ionized atmosphere region, 300 is created may be dependent on the proximity and orientation of the radiation detection sources, either actively or passively. In other words, the height of the modulating ionized atmosphere region, 300 can be determined by the angle at which the beam travels in reference to the horizontal. Referring to FIG. 15, these parameters are shown, for example, as trigonometric parameters to be solved through the analysis of a triangle. The transmitting and receiving sources are located at vertices C and A respectively, and are separated from each other by a distance b. The signal (e.g., modulating ionized atmosphere region, 300) is formed at vertex B when radiation beams having a length a and c meet at a height h. Determination of the various parameters required to generate a signal at a specific height h is done, in this example, through conventional trigonometric techniques.

Security can be provided, for example, through bulk encryption methods. Detection of either invisible or visible signals may be possible, but the use of bulk encryption may maintain an encrypted signature in the atmosphere. The scenarios described in this document are also not limited in this regard.

While the examples provided are based on existing capabilities and point-to-point communications, the end-state may, for example include support point-to-multi-point communications, over-the-horizon, using multiple ionized atmosphere regions, 300 multiplexed together to increase data rates.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A communication device connected to a transmitting antenna at a transmitting location comprising:
    a data encoder capable of encoding an information input from an input device into an encoded data stream;
    a modulator capable of generating a modulated data signal, using the encoded data stream, that, when sent to the transmitting antenna, causes the emission of a modulated radiation transmission that, when directed to an atmospheric point within a line-of-sight of the transmitting location, causes atmospheric gas surrounding the atmospheric point to ionize and form a modulated ionized atmospheric region embedded with the modulated data signal and adapted to provide a medium for communication with a receiving location by varying a reflective cross section of the modulated ionized atmospheric region that is detected using at least a portion of a remote sensor transmission, transmitted from the receiving location, that is reflected back to the receiving location by the modulated ionized atmospheric region.

2. The communication device according to claim 1, further comprising:
    an amplifier, having a power level range between 1 and 10 megawatts, to enable the modulated radiation transmission to ionize atmospheric gas in the modulated ionized atmospheric region based on an expected frequency of the remote sensor transmission from the receiving location.

3. The communication device according to claim 1, further comprising:
    a radiation generator capable of generating electromagnetic radiation that is modulated by the modulated data signal and comprises the modulated radiation transmission emitted by the transmitting antenna.

4. The communication device according to claim 3, wherein the radiation generator is capable of generating unmodulated electromagnetic radiation that, when sent to the transmitting antenna, causes the emission of the remote sensor transmission.

5. The communication device according to claim 4, wherein the electromagnetic radiation is generated at a frequency that is between 400 megahertz and 2.4 gigahertz.

6. The communication device according to claim 4 further comprising:
    a remote sensor receiver comprising a demodulator and a data decoder, wherein the remote sensor receiver is in communication with a receiving antenna capable of receiving the portion of the remote sensor transmission that is reflected by the modulated ionized atmospheric region.

7. The communication device according to claim 6, wherein the modulator and demodulator form a single component that modulates or demodulates depending on whether it is implemented at the transmitting location or the receiving location.

8. The communication device according to claim 6, wherein the data encoder and the data decoder form a single component.

9. The communication device according to claim 8, wherein the single component encodes the information input when implemented at the transmitting location.

10. The communication device according to claim 8, wherein the single component decodes the encoded data stream when implemented at the receiving location.

\* \* \* \* \*